(12) United States Patent
Butzen et al.

(10) Patent No.: US 9,475,141 B2
(45) Date of Patent: Oct. 25, 2016

(54) RECIPROCATING SAW BLADE

(75) Inventors: Robert W. Butzen, Colgate, WI (US);
Erich Herman, Milwaukee, WI (US);
Austin J. Kazda, Wauwatosa, WI (US);
Ryan J. Malloy, Milwaukee, WI (US);
Roger D. Neitzell, Palmyra, WI (US);
Andrew Schulz, Slinger, WI (US);
James Schreiber, West Allis, WI (US);
Courtney McCool, Menomonee Falls, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 163 days.

(21) Appl. No.: 13/566,985

(22) Filed: Aug. 3, 2012

(65) Prior Publication Data
US 2013/0031791 A1    Feb. 7, 2013

Related U.S. Application Data

(60) Provisional application No. 61/515,116, filed on Aug. 4, 2011, provisional application No. 61/515,155, filed on Aug. 4, 2011, provisional application No. 61/605,727, filed on Mar. 1, 2012, provisional application No. 61/605,672, filed on Mar. 1, 2012, provisional application No. 61/613,296, filed on Mar. 20, 2012.

(51) Int. Cl.
*B23D 61/12* (2006.01)

(52) U.S. Cl.
CPC ........... *B23D 61/123* (2013.01); *B23D 61/128* (2013.01)

(58) Field of Classification Search
CPC .... B23D 61/123; B23D 61/128; B27B 21/04

USPC .......................... 83/835, 697; D8/20; 30/355
See application file for complete search history.

(56) References Cited

U.S. PATENT DOCUMENTS

| 118,800 A | | 9/1871 | Green | |
| 486,426 A | * | 11/1892 | Brooks | ........................... 30/348 |

(Continued)

FOREIGN PATENT DOCUMENTS

| CN | 1077474 | | 1/2002 | |
| DE | 3229804 | * | 2/1984 | ............. B27B 33/04 |

(Continued)

OTHER PUBLICATIONS

International Search Report and Written Opinion for Application No. PCT/US2012/049655 dated Jan. 30, 2013 (15 pages).

*Primary Examiner* — Laura M Lee
(74) *Attorney, Agent, or Firm* — Michael Best & Friedrich LLP

(57) ABSTRACT

A reciprocating saw blade for use with a reciprocating saw, the saw blade including a body including a first substantially planar surface and a second substantially planar surface opposite the first surface, an attachment portion for coupling the saw blade to the reciprocating saw, a cutting edge including a plurality of cutting teeth, and a rib element including a pair of outermost rib members. One of the outermost rib members is proximate the cutting edge and the other of the outermost rib members is proximate a back edge of the blade opposite the cutting edge. Each outermost rib member includes a first portion and a second portion. The first portions of each of the ribs are substantially parallel to one another.

8 Claims, 25 Drawing Sheets

(56) References Cited

U.S. PATENT DOCUMENTS

| | | | |
|---|---|---|---|
| 507,071 A | 10/1893 | Huff | |
| 529,528 A | 11/1894 | Goff | |
| 615,518 A * | 12/1898 | Baker et al. | 30/348 |
| 730,398 A | 6/1903 | Pridmore | |
| 791,758 A | 6/1905 | Earle | |
| 1,136,561 A | 4/1915 | Stewart | |
| 1,294,554 A | 2/1919 | Smith | |
| 1,352,140 A | 9/1920 | Napier | |
| 1,613,432 A * | 1/1927 | Barr | 7/150 |
| 1,676,071 A | 7/1928 | Bolinder | |
| 2,730,792 A * | 1/1956 | Ronan | 83/852 |
| 2,784,751 A | 3/1957 | Alexander | |
| 2,791,248 A | 5/1957 | Beale | |
| 2,836,209 A * | 5/1958 | Zern | B23D 49/11 30/502 |
| 2,987,086 A | 6/1961 | Westlund, Jr. | |
| 3,028,889 A | 4/1962 | McCarty | |
| 3,261,097 A | 7/1966 | Ritter | |
| 3,357,462 A | 12/1967 | Carven | |
| 3,537,491 A | 11/1970 | Kolesh | |
| 3,602,991 A | 9/1971 | Heinrich et al. | |
| 3,630,699 A | 12/1971 | Catlin et al. | |
| 3,716,916 A | 2/1973 | Alexander | |
| 3,742,603 A | 7/1973 | Yamaoka | |
| 3,916,522 A | 11/1975 | Sakai et al. | |
| 3,927,893 A | 12/1975 | Dillon et al. | |
| 3,929,050 A | 12/1975 | Salzwedel | |
| 3,988,955 A | 11/1976 | Engel et al. | |
| 3,990,338 A | 11/1976 | Wikner et al. | |
| 3,994,065 A | 11/1976 | Plum | |
| 4,021,899 A | 5/1977 | Jensen | |
| 4,036,236 A | 7/1977 | Rhodes, Jr. | |
| 4,039,700 A | 8/1977 | Sohmer et al. | |
| 4,102,230 A | 7/1978 | Magnusson et al. | |
| 4,106,181 A | 8/1978 | Mattchen | |
| 4,248,284 A | 2/1981 | Tomosada | |
| 4,385,441 A | 5/1983 | Young | |
| 4,386,609 A | 6/1983 | Mongeon | |
| 4,442,559 A | 4/1984 | Collins | |
| 4,513,742 A | 4/1985 | Arnegger | |
| 4,574,676 A | 3/1986 | Jansen-Herfeld | |
| 4,625,594 A | 12/1986 | Janke | |
| 4,806,731 A | 2/1989 | Bragard et al. | |
| 4,819,334 A | 4/1989 | Mongeon | |
| 4,872,452 A | 10/1989 | Alexson | |
| 4,943,042 A | 7/1990 | Jung | |
| 4,945,640 A | 8/1990 | Garg et al. | |
| 5,002,555 A | 3/1991 | Petersen | |
| 5,016,356 A | 5/1991 | Trench | |
| 5,088,372 A | 2/1992 | Lund et al. | |
| 5,100,506 A | 3/1992 | Sturtevant et al. | |
| 5,103,565 A | 4/1992 | Holzer, Jr. | |
| 5,119,708 A | 6/1992 | Musgrove | |
| 5,122,142 A | 6/1992 | Pascaloff | |
| 5,133,728 A | 7/1992 | Petersen | |
| 5,135,533 A | 8/1992 | Petersen et al. | |
| 5,182,976 A | 2/1993 | Wittkopp | |
| 5,193,280 A | 3/1993 | Jackson | |
| 5,219,378 A | 6/1993 | Arnold | |
| 5,295,426 A | 3/1994 | Planchon | |
| 5,340,129 A | 8/1994 | Wright | |
| 5,433,457 A | 7/1995 | Wright | |
| D361,029 S | 8/1995 | Goris | |
| D365,424 S | 12/1995 | Weller | |
| 5,507,763 A | 4/1996 | Petersen et al. | |
| 5,517,889 A | 5/1996 | Logan | |
| 5,524,518 A | 6/1996 | Sundstrom | |
| 5,554,165 A | 9/1996 | Raitt et al. | |
| 5,555,788 A | 9/1996 | Gakhar et al. | |
| 5,573,255 A | 11/1996 | Salpaka | |
| 5,644,847 A | 7/1997 | Odendahl et al. | |
| D388,318 S | 12/1997 | Achterberg et al. | |
| 5,704,828 A | 1/1998 | Young et al. | |
| 5,711,287 A | 1/1998 | Speer | |
| 5,724,742 A | 3/1998 | Grabowski | |
| 5,802,947 A | 9/1998 | Ward, Jr. et al. | |
| 5,809,657 A | 9/1998 | Mortensen | |
| D402,516 S * | 12/1998 | Okada | D8/20 |
| D406,023 S | 2/1999 | Okada | |
| 5,918,525 A | 7/1999 | Schramm | |
| RE36,269 E | 8/1999 | Wright | |
| 5,946,810 A | 9/1999 | Hoelderlin et al. | |
| 6,023,848 A | 2/2000 | Dassoulas et al. | |
| 6,145,426 A | 11/2000 | Ward et al. | |
| 6,178,646 B1 | 1/2001 | Schnell et al. | |
| 6,234,727 B1 | 5/2001 | Barazani | |
| D448,634 S | 10/2001 | Hickman | |
| 6,401,585 B1 | 6/2002 | Morgan | |
| D465,138 S | 11/2002 | Raines | |
| 6,516,525 B2 * | 2/2003 | Liu | 30/519 |
| 6,532,855 B1 | 3/2003 | Ward et al. | |
| D479,106 S | 9/2003 | Robertsson | |
| D479,107 S | 9/2003 | Rack | |
| 6,612,039 B2 | 9/2003 | Kakiuchi et al. | |
| 6,656,186 B2 | 12/2003 | Meckel | |
| 6,662,698 B2 | 12/2003 | Wheeler et al. | |
| 6,678,959 B1 | 1/2004 | Phillip et al. | |
| 6,684,481 B2 | 2/2004 | Kullmer | |
| 6,725,548 B1 | 4/2004 | Kramer et al. | |
| 6,857,348 B1 | 2/2005 | Mason | |
| 6,860,886 B1 | 3/2005 | Lee | |
| 6,871,405 B2 | 3/2005 | Reale et al. | |
| 6,872,133 B2 | 3/2005 | Lee et al. | |
| 6,895,650 B2 | 5/2005 | Fried et al. | |
| 6,896,679 B2 | 5/2005 | Danger et al. | |
| 7,001,403 B2 | 2/2006 | Hausmann et al. | |
| 7,127,820 B2 | 10/2006 | Miller | |
| D534,401 S | 1/2007 | Duffin et al. | |
| D536,791 S * | 2/2007 | Eskridge et al. | D24/146 |
| 7,251,897 B2 | 8/2007 | Shuhua | |
| 7,257,900 B2 | 8/2007 | Wheeler et al. | |
| D572,821 S | 7/2008 | Burgard | |
| D578,848 S | 10/2008 | Camacho | |
| 7,497,860 B2 | 3/2009 | Carusillo et al. | |
| D601,869 S | 10/2009 | Nelson | |
| 7,600,458 B2 | 10/2009 | Hampton et al. | |
| D603,231 S | 11/2009 | Fisher et al. | |
| 7,658,136 B2 | 2/2010 | Rompet et al. | |
| 7,691,106 B2 | 4/2010 | Schenberger et al. | |
| 7,748,125 B2 | 7/2010 | Rakaczki | |
| 7,806,033 B2 | 10/2010 | Kocher et al. | |
| 7,871,080 B2 | 1/2011 | Marini et al. | |
| 7,946,041 B2 | 5/2011 | Frankl | |
| D645,330 S | 9/2011 | Jones et al. | |
| 8,042,443 B2 | 10/2011 | Nishio et al. | |
| 8,046,926 B2 | 11/2011 | Bigden et al. | |
| 8,261,456 B2 | 9/2012 | Scott et al. | |
| D687,275 S | 8/2013 | Neitzell | |
| D687,276 S | 8/2013 | Ji | |
| D688,543 S | 8/2013 | Neitzell et al. | |
| D695,083 S | 12/2013 | Neitzell et al. | |
| D706,099 S | 6/2014 | Neitzell et al. | |
| 2002/0042998 A1 | 4/2002 | Napoli | |
| 2002/0184988 A1 | 12/2002 | Rohman et al. | |
| 2003/0024354 A1 | 2/2003 | Ward et al. | |
| 2003/0145472 A1 | 8/2003 | Swift | |
| 2003/0192419 A1 | 10/2003 | Conti | |
| 2004/0221461 A1 | 11/2004 | Knisley et al. | |
| 2006/0053630 A1 | 3/2006 | White | |
| 2006/0137498 A1 | 6/2006 | Bowling | |
| 2006/0174495 A1 | 8/2006 | Jumior | |
| 2007/0074405 A1 | 4/2007 | Nottingham et al. | |
| 2008/0172890 A1 | 7/2008 | Shetterly | |
| 2009/0071015 A1 | 3/2009 | Scott | |
| 2009/0145280 A1 | 6/2009 | Bucks et al. | |
| 2009/0273146 A1 | 11/2009 | Dezheng et al. | |
| 2010/0175532 A1 | 7/2010 | Evatt et al. | |
| 2010/0218389 A1 | 9/2010 | Kalomeris et al. | |
| 2010/0228256 A1 | 9/2010 | Walen et al. | |
| 2011/0000475 A1 | 1/2011 | Baratta et al. | |
| 2011/0074122 A1 | 3/2011 | Marini et al. | |
| 2012/0041443 A1 | 2/2012 | Landon | |
| 2012/0042765 A1 | 2/2012 | Kazda et al. | |
| 2012/0090443 A1 | 4/2012 | Butzen et al. | |

(56) References Cited

U.S. PATENT DOCUMENTS

FOREIGN PATENT DOCUMENTS

| | | |
|---|---|---|
| DE | 3738016 | 5/1989 |
| DE | 3838844 | 5/1990 |
| DE | 10014222 | 9/2001 |
| DE | 10010526 | 10/2001 |
| DE | 10107847 | * 9/2002 ............. B23D 51/02 |
| DE | 69731304 | 11/2005 |
| DE | 102008018676 | * 10/2009 ............. B27B 21/04 |
| EP | 0695607 | 2/1996 |
| FR | 1169494 | 12/1958 |
| GB | 2179593 | 3/1987 |
| GB | 2439291 | 12/2007 |
| JP | 06-143029 | 5/1994 |
| JP | 10-328929 | 12/1998 |
| JP | 2007-326194 | 12/2007 |
| WO | WO 2012028890 | 3/2012 |

* cited by examiner

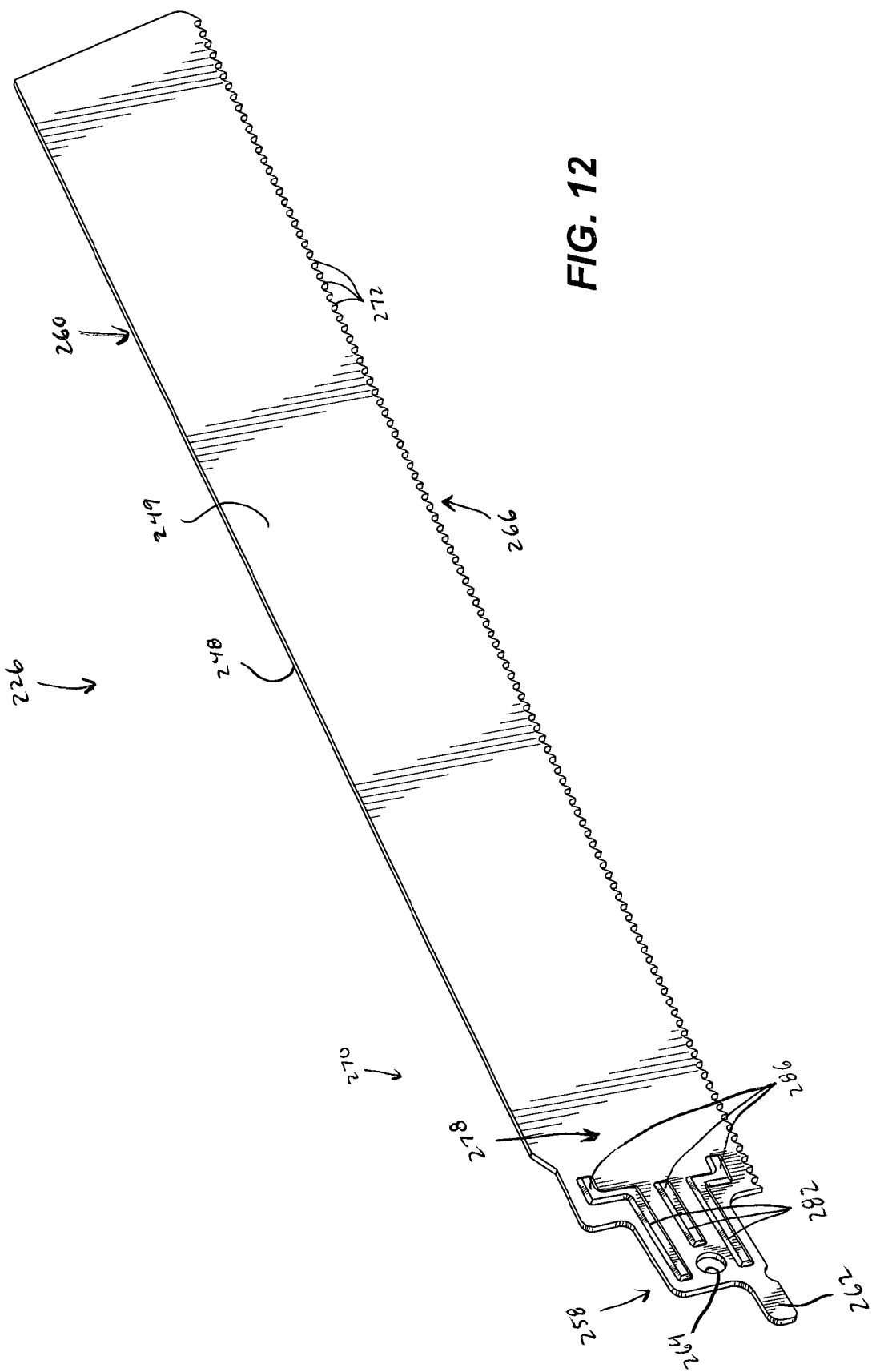

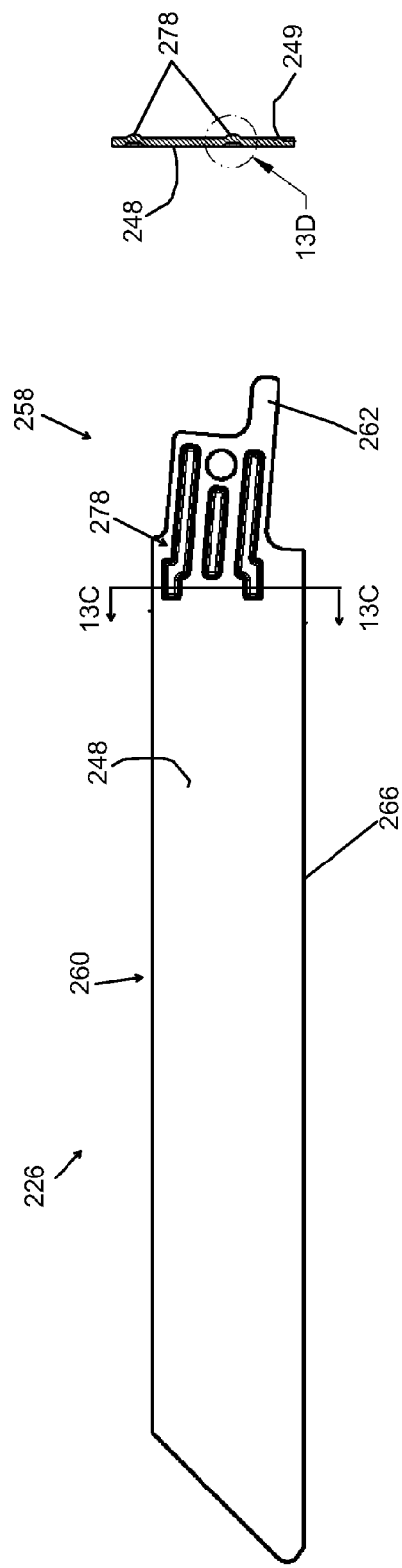
FIG. 13B
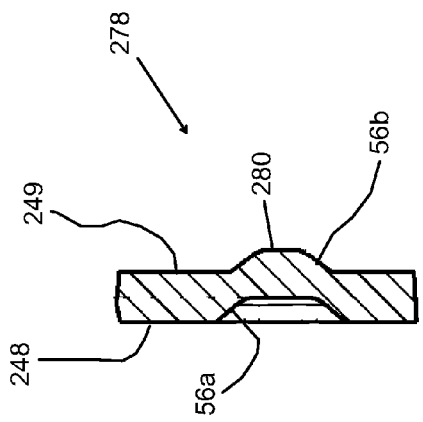
FIG. 13C
FIG. 13D

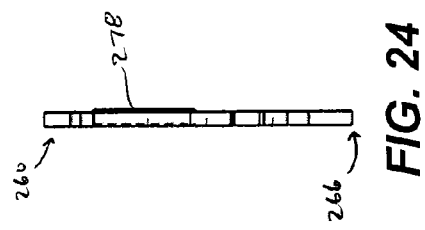
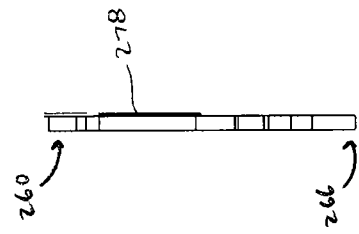
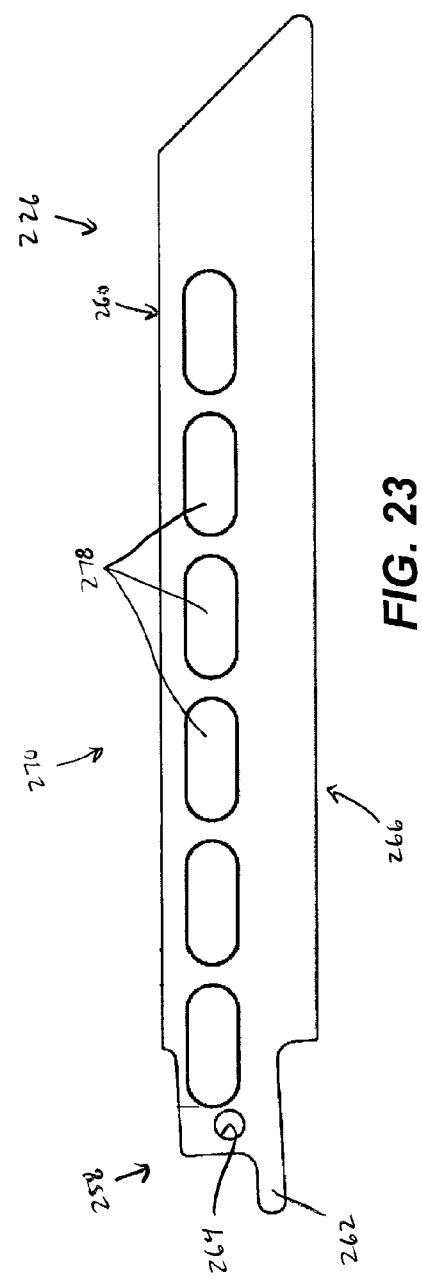
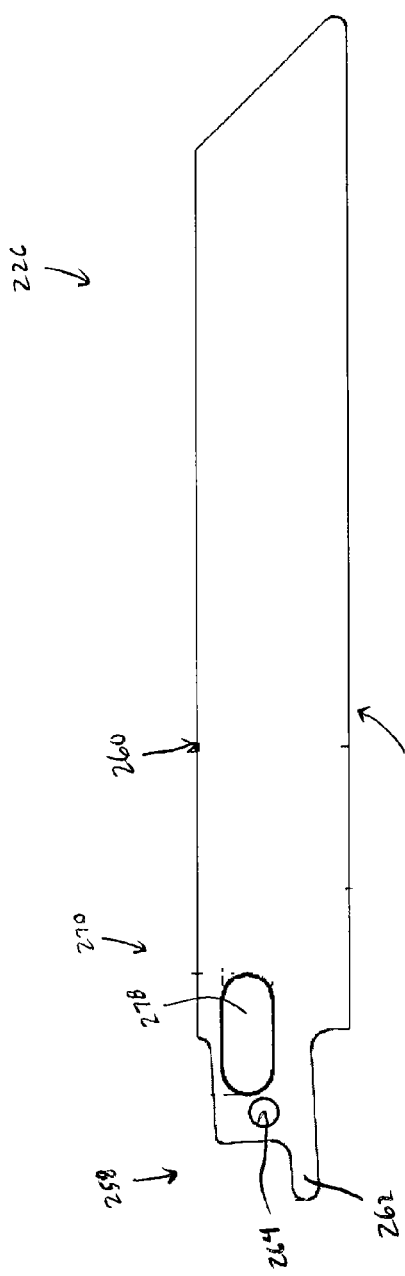

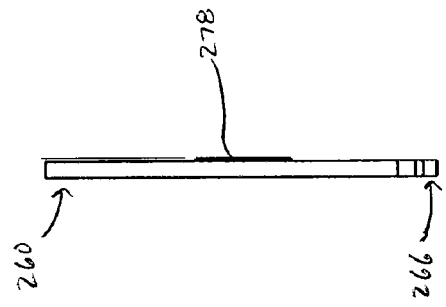
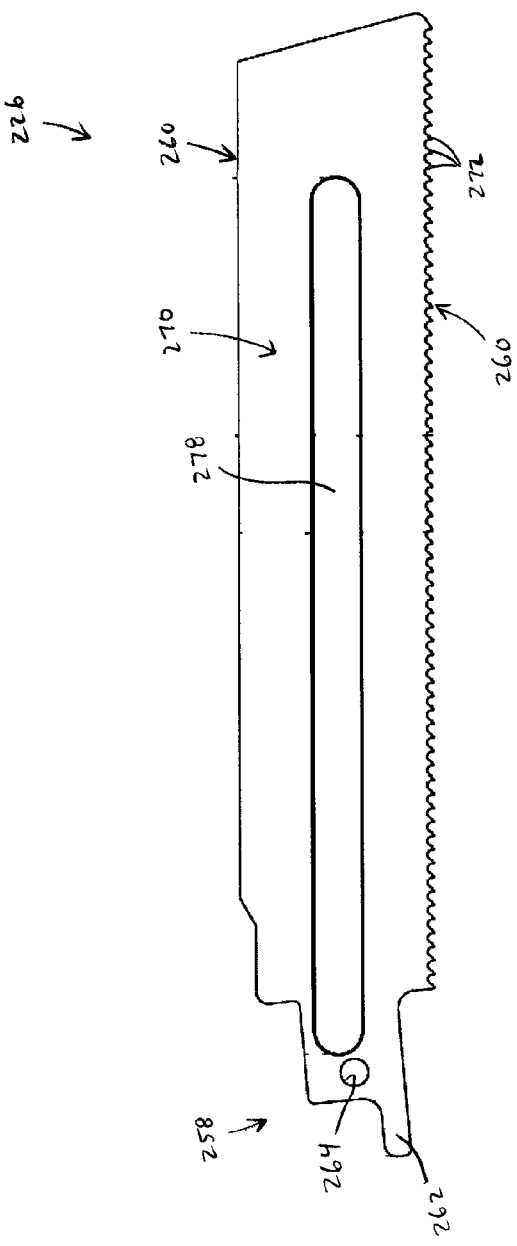
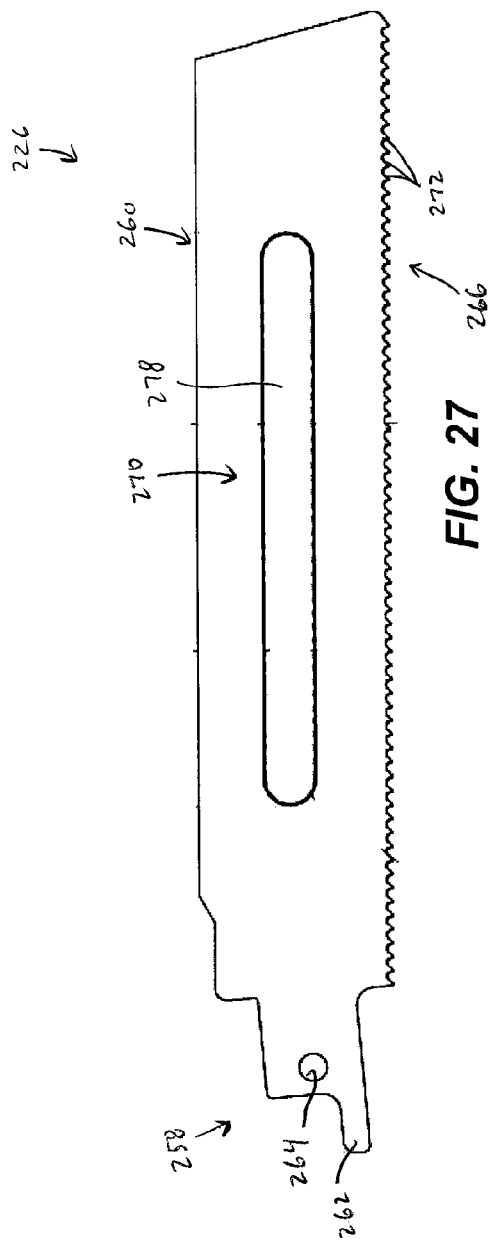
FIG. 26
FIG. 25
FIG. 27

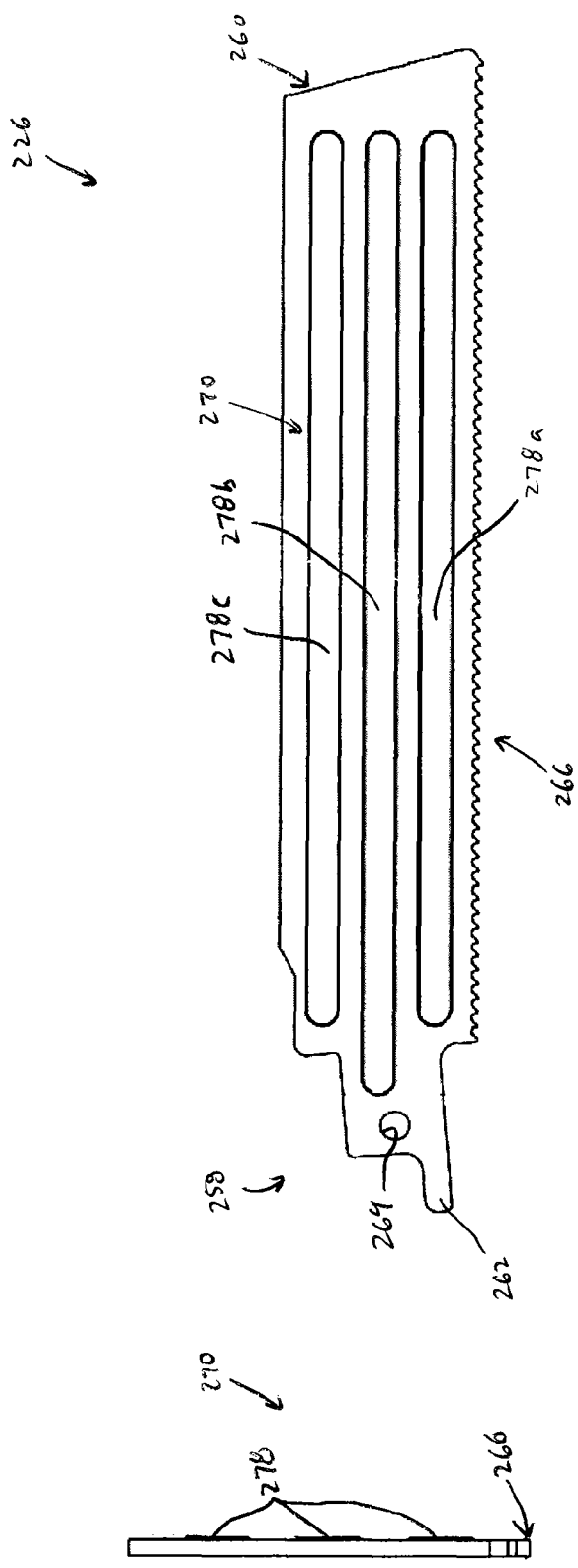

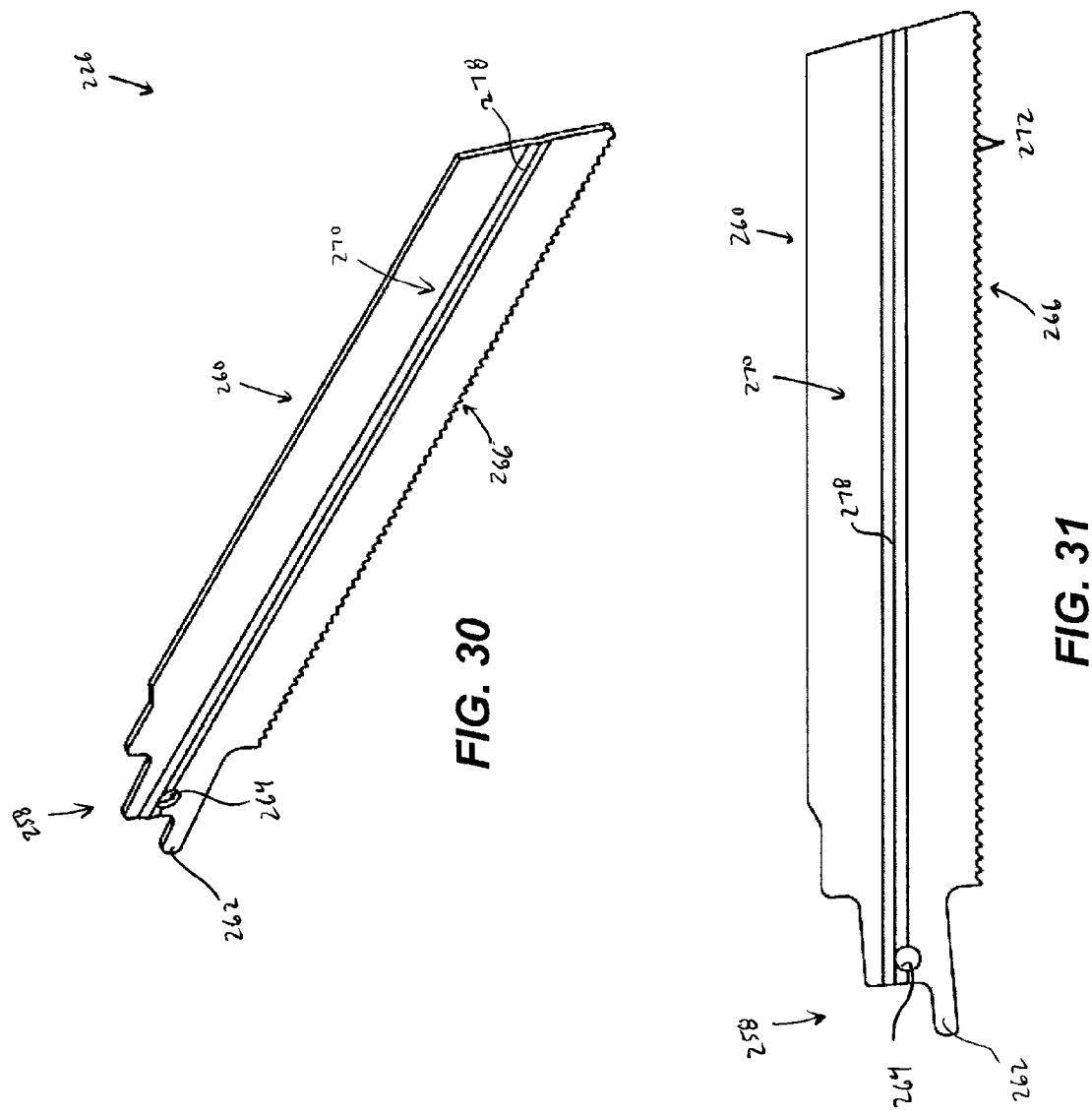

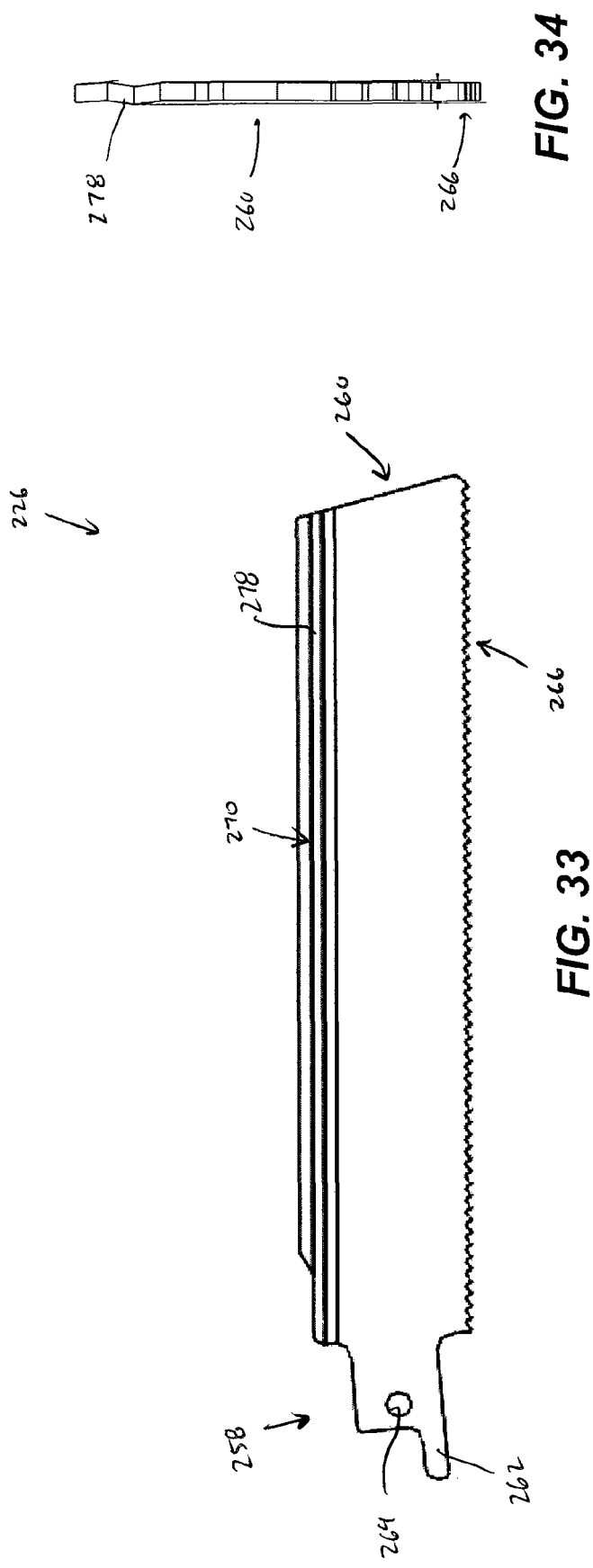

RECIPROCATING SAW BLADE

RELATED APPLICATIONS

This application claims the benefit of prior-filed, U.S. Provisional Application No. 61/515,116, filed Aug. 4, 2011, U.S. Provisional Application No. 61/515,155, filed Aug. 4, 2011, U.S. Provisional Application No. 61/605,727, filed Mar. 1, 2012, U.S. Provisional Application No. 61/605,672, filed Mar. 1, 2012, and U.S. Provisional Application No. 61/613,296, filed Mar. 20, 2012, the entire contents of all of which are hereby incorporated by reference.

BACKGROUND

The invention relates to accessories for power tools, such as blades, and more particularly to a blade for a reciprocating saw. The invention also relates to stock material from which an accessory is made.

Power tools, such as reciprocating saws, typically include removable blades to allow for replacement of worn or damaged blades. Saw blades, and other accessories, are typically made from smooth sheets of coil stock material. Saw blades are used for cutting wood, metal, plastics, and other materials. A saw blade typically includes a body, one or more attachment portions, and a cutting edge. The cutting edge comprises a plurality of teeth made up of one or more tooth forms. Tooth forms on saw blades are a major factor in the durability, cost, speed of cutting, and accuracy and quality of cuts made.

During operation, the work material may cause the saw blade to bend, deforming or even breaking the blade if the blade is not thick enough to resist the bending. For example, when a saw blade is used to cut an interior corner, the blade tends to bend against the wall. This prevents the user from cutting the work piece along a straight line that is parallel to the inside wall. This problem is especially problematic on short saw blades, i.e., blades that are six inches in length or less. In addition to prohibiting a straight cut, the bending of the saw blade can deform or break the blade if the blade is not thick enough to resist the bending.

Similarly, during operation the reciprocating saw blade may bind in the work material or become caught on a nail or obstruction in the material. This binding can create a shear force that is sufficient to break off one or more teeth. As each tooth breaks off, the life of the other teeth and the life of the blade overall is dramatically decreased. As the blades wear, the user must adjust the cutting angle to create contact between alternate tooth surfaces and the work material in order to speed up the cutting time and extend the life of the blade.

SUMMARY

In one embodiment, the invention provides a reciprocating saw blade for use with a reciprocating saw. The saw blade includes a body including a first substantially planar surface and a second substantially planar surface opposite the first surface, an attachment portion for coupling the saw blade to the reciprocating saw, a cutting edge including a plurality of cutting teeth, and a rib element including a pair of outermost rib members. One of the outermost rib members is proximate the cutting edge and the other of the outermost rib members is proximate a back edge of the blade opposite the cutting edge. Each outermost rib member includes a first portion and a second portion. The first portions of each of the ribs are substantially parallel to one another.

In another embodiment, the invention provides a saw blade for use with a power tool. The saw blade includes an attachment portion for coupling the saw blade to the power tool, a body including a first substantially planar surface and a second substantially planar surface opposite the first surface, a cutting portion extending along an edge of the body, and a plurality of hexagons formed on at least one of the first surface and the second surface. The plurality of hexagons are arranged in a honeycomb pattern in which at least one side of each hexagon is substantially parallel to a corresponding side of an adjacent hexagon.

In yet another embodiment, the invention provides an accessory for use with a power tool. The accessory includes an attachment portion for coupling the accessory to the power tool, a body including a first substantially planar surface and a second substantially planar surface opposite the first surface, and a cutting portion extending along an edge of the body. At least a portion of the accessory includes a honeycomb pattern defined by relief portions formed on the first substantially planar surface, and the relief portions define a plurality of hexagons and a grid positioned between the hexagons. Each of the hexagons includes a perimeter.

Other aspects of the invention will become apparent by consideration of the detailed description and accompanying drawings.

BRIEF DESCRIPTION OF THE DRAWINGS

FIG. 12 is a perspective view of a saw blade according to another embodiment of the invention.

FIG. 13B is a side view of the saw blade of FIG. 12.

FIG. 13C is a cross-section view of the saw blade of FIG. 13B taken along line 13C-13C.

FIG. 13D is an enlarged cross-sectional view of the saw blade of FIG. 13C.

FIG. 21 is a side view of a saw blade according to another embodiment of the invention.

FIG. 22 is a front view of the saw blade of FIG. 21.

FIG. 23 is a side view of a saw blade according to another embodiment of the invention.

FIG. 24 is a front view of the saw blade of FIG. 23.

FIG. 25 is a side view of a saw blade according to another embodiment of the invention.

FIG. 26 is a front view of the saw blade of FIG. 25.

FIG. 27 is a side view of a saw blade according to another embodiment of the invention.

FIG. 28 is a side view of a saw blade according to another embodiment of the invention.

FIG. 29 is a front view of the saw blade of FIG. 28.

FIG. 30 is a perspective view of a saw blade according to another embodiment of the invention.

FIG. 31 is a side view of the saw blade of FIG. 30.

FIG. 32 is a front view of the saw blade of FIG. 30.

FIG. 33 is a side view of a saw blade according to another embodiment of the invention.

FIG. 34 is a front view of the saw blade of FIG. 33.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
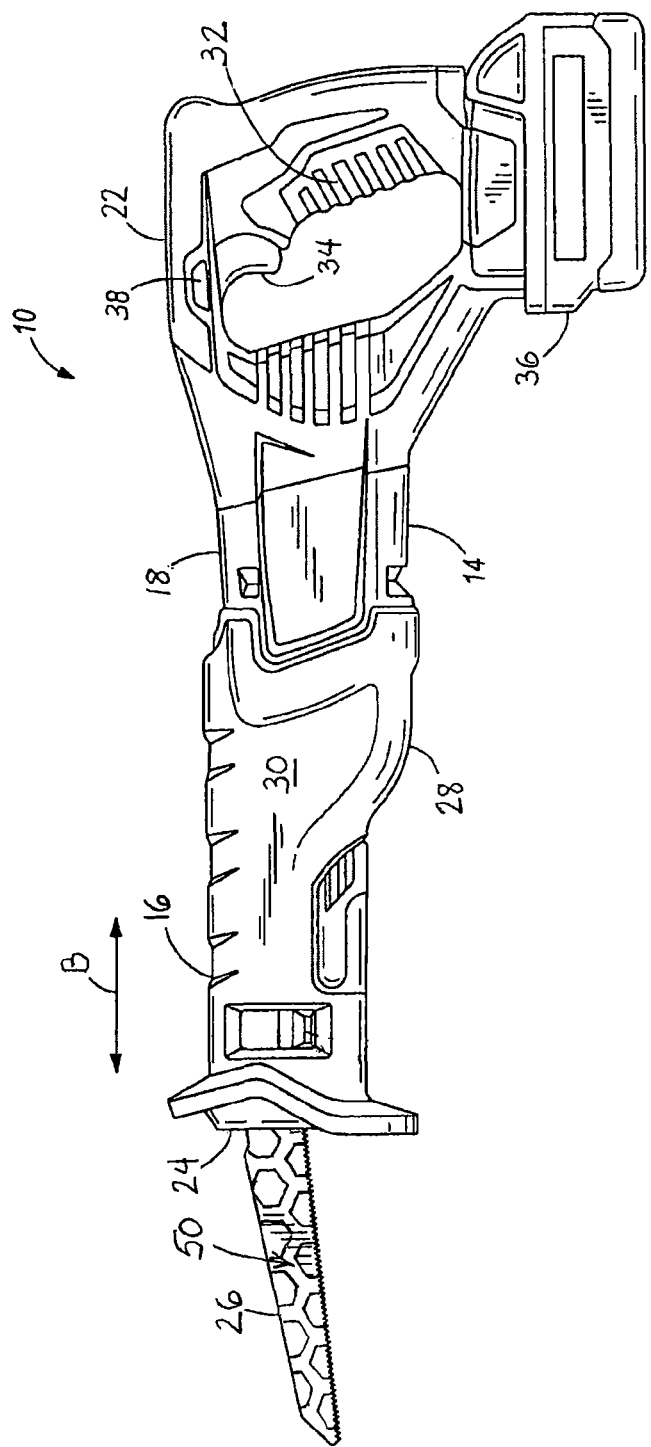
FIG. 1 is a side view of a reciprocating power tool for receiving an accessory, such as a saw blade, according to an embodiment of the invention.
Figure 2:
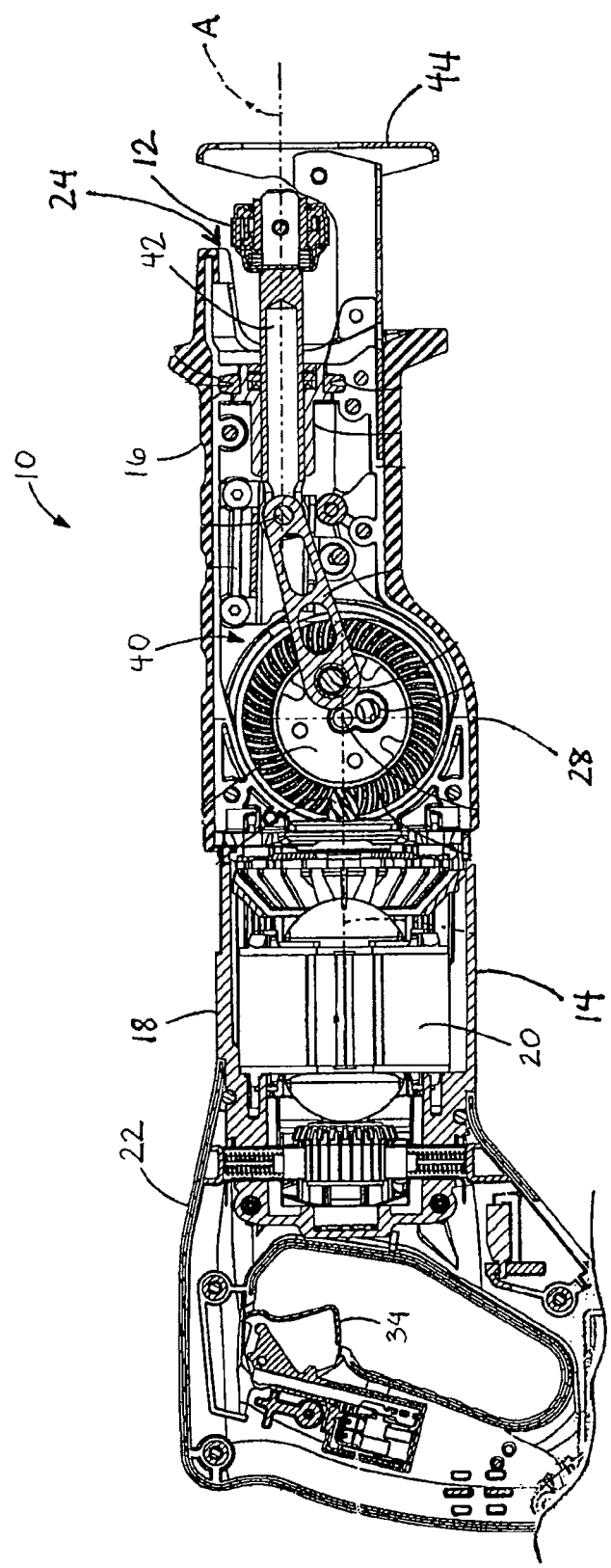
FIG. 2 is a cross-section of the reciprocating power tool shown in FIG. 1 and including a shoe.
Figure 3:
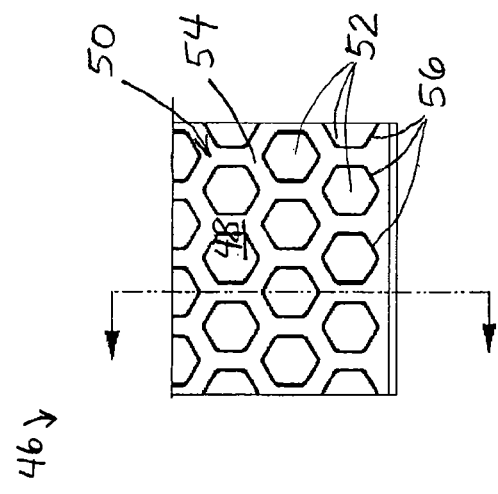
FIG. 3 is a front view of a sheet of material, from which the accessory may be formed, according to an embodiment of the invention.
Figure 6:
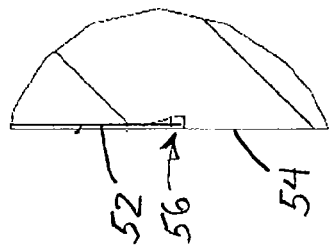
FIG. 6 is an enlarged view of the cross-section of the sheet illustrated in FIG. 4.
Figure 4:
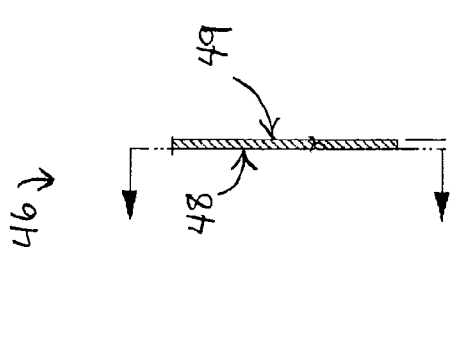
FIG. 4 is cross-sectional view of the sheet illustrated in FIG. 3 taken along line 4-4.

FIGS. 1 and 2 illustrate a reciprocating power tool 10 including a blade clamp mechanism 12. The illustrated reciprocating power tool 10 is a reciprocating saw; however, in other embodiments, the invention may include other types of power tools, such as circular saws, oscillating tools, etc. As shown in FIGS. 1 and 2, the power tool 10 includes a saw housing 14 having a forward portion 16, a body portion 18 housing a motor 20 (FIG. 2), and a handle portion 22. The forward portion 16 of the saw housing 14 includes a blade receiving aperture or end 24 that receives a saw blade 26 (FIG. 1), or other type of accessory, according to one embodiment of the invention, as will be described in greater detail below. The saw blade 26, or accessory, is releasably coupled to a blade clamp mechanism 12 (FIG. 2) positioned within the saw housing 14, specifically, within the receiving aperture 24. In the illustrated embodiment, a boot or grip portion 28 is positioned over the forward portion 16 of the saw housing 14. In this embodiment, the boot 28 provides a grip area 30 for the user and/or provides protection to the tool 10. In some embodiments, the boot 28 is over-molded onto the forward portion 16. The handle portion 22 includes an over-mold to define an ergonomic grip 32 and allows a user to hold and control the power tool 10.

With continued reference to FIGS. 1 and 2, the power tool 10 includes a trigger-type power switch 34 for activating a power supply 36 of the tool 10 and a button or switch 38 for selecting a speed level (e.g., a high speed or a low speed) for reciprocating the saw blade 26. In the illustrated embodiment, the power supply 36 is a rechargeable battery pack. The battery pack 36 is releasably coupled to the handle portion 22 to provide power to the power tool 10, and is releasable away from and rearward of the handle portion 22. In the illustrated embodiment, the battery pack 36 is an eighteen-volt (18V) rechargeable power tool battery pack. In other embodiments, the battery pack 36 may be a twelve-volt (12V), a twenty-four-volt (24V), or other various voltages. According to another embodiment, the power supply 36 may be an alternating current (AC) power provided via a corded plug electrically coupled to a wall outlet or any number of suitable powering options.

With reference to the cross section illustrated in FIG. 2, the reciprocating tool 10 also includes a drive mechanism 40 positioned substantially within the housing 14. The drive mechanism 40 is coupled to the motor 20 and to a spindle 42 for transferring rotational motion of a shaft of the motor 20 into reciprocating motion of the spindle 42 along a longitudinal axis A relative to the housing 14. The blade clamp mechanism 12 is disposed at a distal end of the spindle 42 for receiving the blade 26. The blade clamp mechanism 12 secures the blade 26 to the spindle 42 for reciprocation with the spindle 42 in a direction B (FIG. 1) parallel to the longitudinal axis A. In other embodiments, other suitable types and configurations of blade clamp mechanisms may be employed.

The reciprocating tool 10 also includes a removable shoe 44, illustrated in FIG. 2, operable to engage a work piece and provide stability to the tool 10 while cutting. The shoe 44 may be removed when the accessory 26 is attached to the blade clamp mechanism 12. The shoe 44 acts as a stop to limit the depth of the saw blade 26 into the workpiece and to prevent the workpiece from engaging the saw blade 26 at a connection of the saw blade 26 to the tool 10, e.g., at the blade clamp mechanism 12. In some embodiments, the shoe 44 freely pivots about an axis to allow the user to adjust an angle at which the blade 26 engages the workpiece during a cut. In some embodiments, the reciprocating tool 10 may not include a shoe.

In other embodiments, the power tool 10 may include various handle constructions, drive mechanisms, blade clamp mechanisms, and power configurations. In further embodiments, the power tool 10 may include other types of power and speed control switches or may not include a speed control feature.

FIGS. 3-7 illustrate a sheet 46 according to an embodiment of the invention. The sheet 46 is formed from a material. For example, the material may include bi-metal strip or a hardened steel. In other embodiments, other suitable materials may be employed. The blade 26 may be formed from the sheet 46, as illustrated in FIG. 8.

The sheet 46 includes a first surface 48 (FIG. 4) and a second surface 49 opposite the first surface 48. The first surface 48 and the second surface 49 are substantially planar. The first surface 48 includes a honeycomb pattern 50 defined by relief, or texture, in the first surface 48. In the illustrated embodiment, the honeycomb pattern 50 includes a pattern of discrete shapes 52 and a grid 54 defined between the pattern of discrete shapes 52. Each discrete shape 52 includes a perimeter 56. In the illustrated embodiment, the discrete shapes 52, and therefore the perimeters 56, are hexagons. In other embodiments, other shapes, such as octagons, rectangles, pentagons, other polygons, or other shapes having curved and/or straight sides, may be employed. In some embodiments, both the first surface 48 and the second surface 49 have a honeycomb pattern 50. In some embodiments, the honeycomb pattern 50 is aligned on the first surface 48 with respect to the second surface 49. In other embodiments, the honeycomb pattern 50 is offset on the first surface 48 with respect to the second surface 49. In yet other embodiments, only the second surface 49 includes the honeycomb pattern 50.

Figure 7:
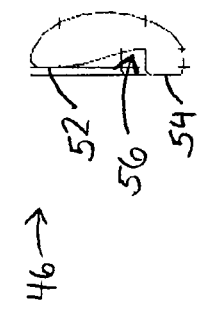
FIG. 7 is an enlarged view of the enlarged view illustrated in FIG. 6.
Figure 5:
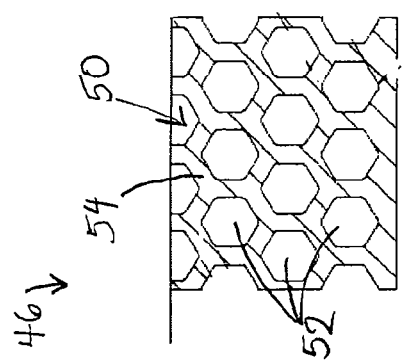
FIG. 5 is a cross-sectional view of the sheet illustrated in FIG. 4 taken along line 5-5.

The relief of the honeycomb pattern 50 includes raised surfaces and depressed surfaces. The relief may also include nominal surfaces. In the illustrated embodiment, the grid 54 is raised with respect to the pattern of discrete shapes 52. As shown in FIG. 7, the grid 54 is raised from the surface of the discrete shapes 52 by about 0.001 inches. In other embodiments, the grid 54 may be raised from the surface of the discrete shapes 52 by between about 0.000 inches and about 0.005 inches. The surface of the discrete shapes 52 is nominal. For example, the nominal thickness of the sheet 46 is 0.0420 inches, but may have other thicknesses in other embodiments. The perimeters 56 are depressed with respect to the surface of the discrete shapes 52. As shown in FIG. 7, the perimeters 56 are depressed from the surface of the discrete shapes 52 by about 0.0020 inches. In other embodiments, the perimeters 56 are depressed from the surface of the discrete shapes 52 by between about 0.000 inches and about 0.005 inches. In other embodiments, any other combinations of raised, nominal and depressed, as defined above, for the discrete shapes 52, the grid 54 and the perimeters 56 may be employed. For example, the discrete shapes 52 may be raised, the grid 54 nominal and the perimeter 56 depressed. In yet other embodiments, some of the discrete shapes 52 may be raised and some of the discrete shapes 52 may be nominal. For example, the discrete shapes 52 may alternate raised and nominal in a pattern. In some embodiments, none of the features are nominal. In embodiments in which both the first surface 48 and the second surface 49 include the honeycomb pattern 50, the first surface 48 and the second surface 49 may have the same type of honeycomb pattern 50. In other such embodiments, the first surface 48 and the second surface 49 may have different types of honeycomb patterns 50.

Figure 8:
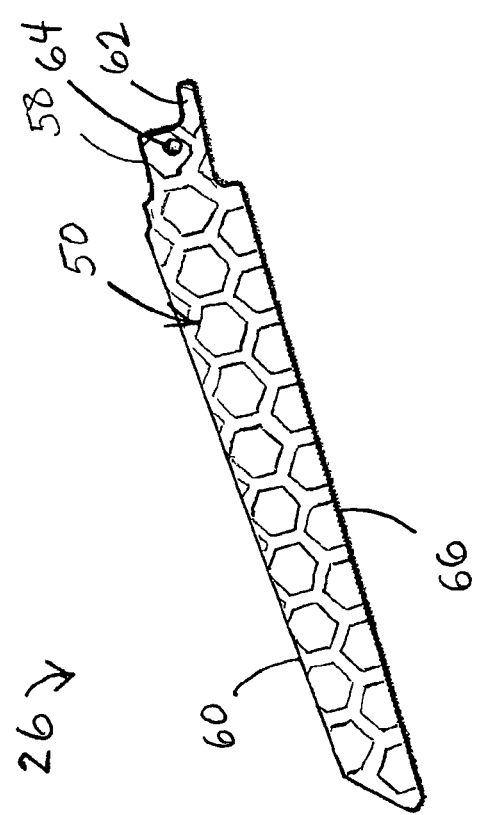
FIG. 8 is a profile view of the accessory illustrated in FIG. 1.

As illustrated in FIG. 8, the blade 26, or other type of accessory for a power tool, is cut from the sheet 46 and includes the honeycomb pattern 50 (not to scale), as described above. The blade 26 includes an attachment portion 58 and a body 60 extending from the attachment portion 58. In the illustrated embodiment, the body 60 and the attachment portion 58 are integrally formed as a single piece such that the saw blade 26 is a unitary structure. In other embodiments, the saw blade 26 may be formed from multiple pieces that are welded or otherwise secured together. The body 60 includes a working portion, such as a cutting edge 66 having teeth, for performing an operation on a workpiece. The attachment portion 58 includes a tang 62 and an aperture 64. The tang 62 and the aperture 64 are configured to engage the blade clamp mechanism 12 to securely and releasably connect the blade 26 to the reciprocating tool 10. In other embodiments, other types or configurations of attachment portions may be employed in order to suit the blade clamp mechanism 12 of the reciprocating tool 10. In other embodiments, the blade 26, or accessory, may be embodied as a different type of accessory or as an accessory for another type of power tool, and may include other types of attachment portions suitable for attachment to the other types of power tools, other types of bodies suitable for other functions, and other types of working portions 66 suitable for performing other operations on a workpiece.

In operation, an operator attaches the attachment blade 26 to the blade clamp mechanism 12 for reciprocation with the spindle 42 of the reciprocating tool 10. The blade 26 reciprocates generally parallel to the longitudinal axis A of the spindle 42 to perform an operation on a workpiece, for example, to cut a workpiece. The honeycomb pattern 50 increases stiffness of the blade 26 to improve performance during the cutting operation.

FIGS. 9-34 illustrate a reciprocating saw blade 226 according to another embodiment of the invention. The illustrated saw blade 226 is similar to the saw blade 26 described above with reference to FIGS. 1-8, and similar parts have been given the same reference numbers plus 200.

Figure 9:
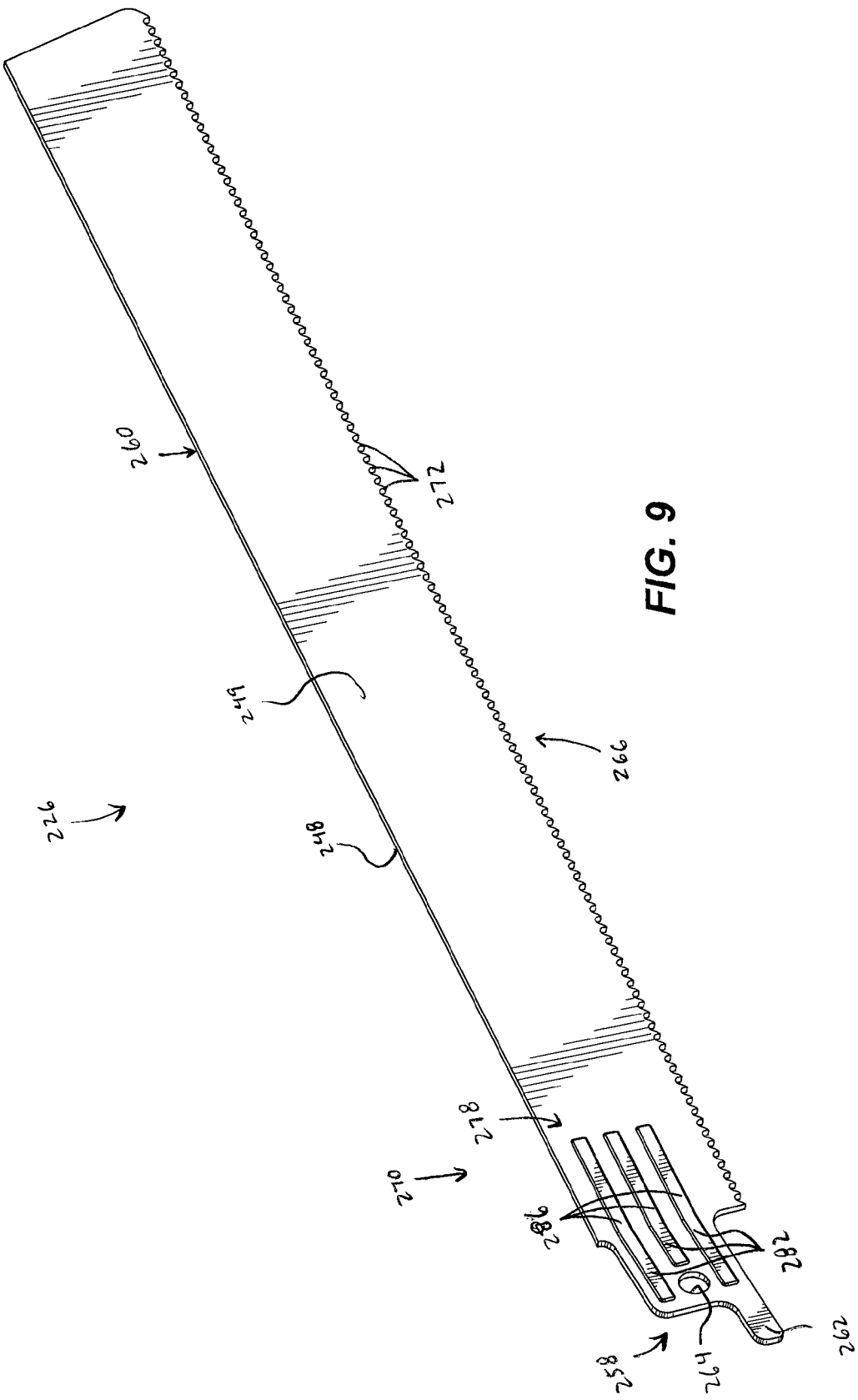
FIG. 9 is a perspective view of a saw blade according to an embodiment of the invention.
Figure 10:
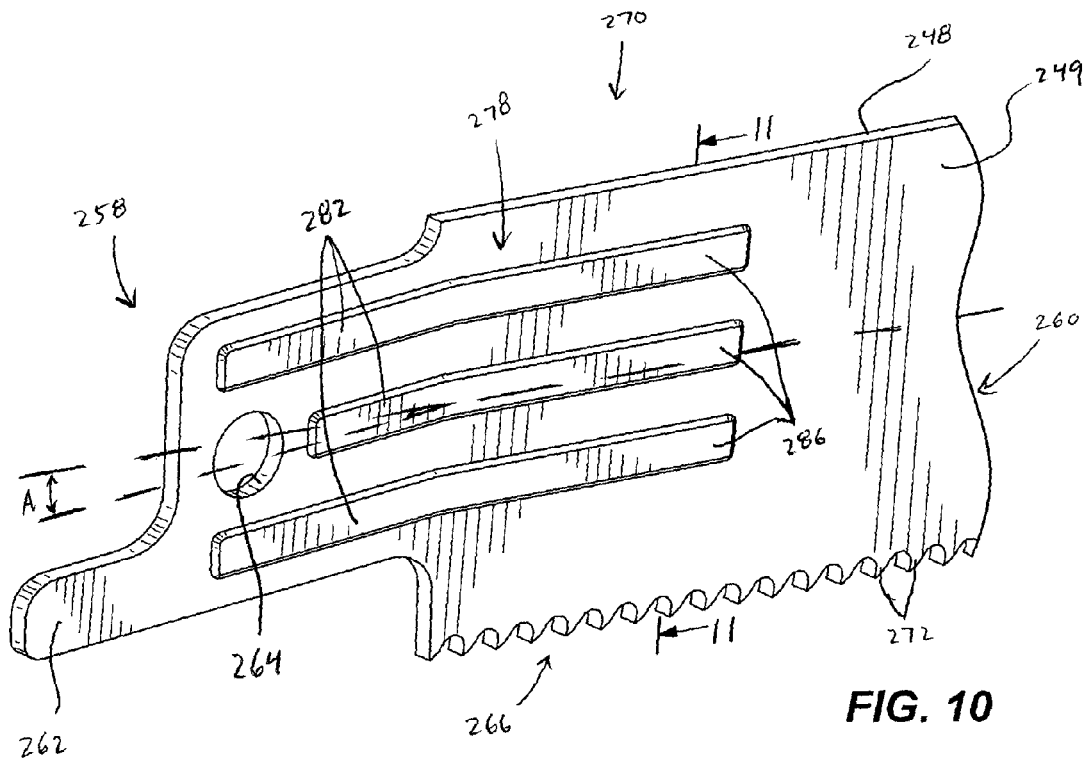
FIG. 10 is an enlarged perspective view of the saw blade of FIG. 9.
Figure 11:
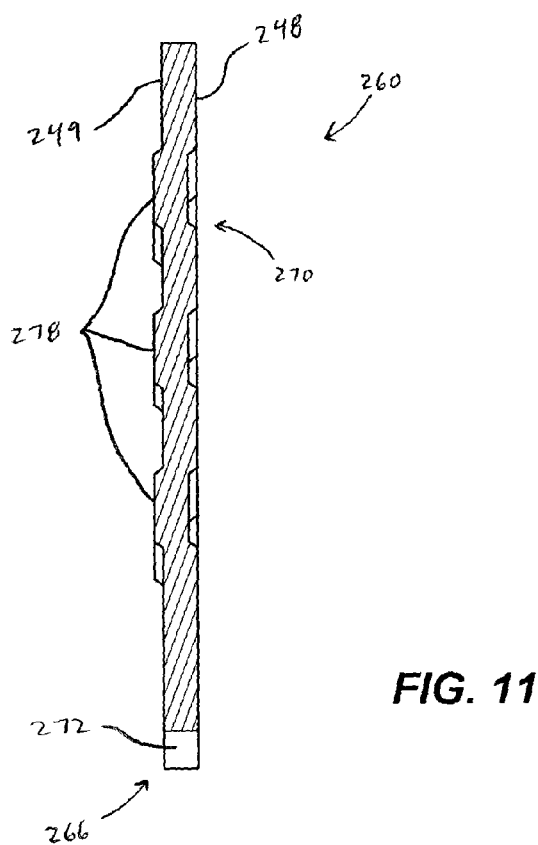
FIG. 11 is a cross-sectional view of the saw blade of FIG. 10 taken along line 11-11.

Referring to FIGS. 9-11, the saw blade 226 includes a body 260, an attachment portion 258 for coupling the blade 226 to a reciprocating saw, and a raised element, or a rib element 270. The body 260 includes a first surface 248, a second surface 249 opposite the first surface 248, and a cutting edge 266 having cutting teeth 272. The attachment portion 258 includes a tang 262 and an aperture 264. In the illustrated embodiment, the attachment portion 258 is angled relative to the body 260 by a tang angle A (FIG. 10). In other embodiments, the tang angle A may be larger or smaller.

As shown in FIGS. 9-11, the rib element 270 is formed as three substantially parallel ribs 278 extending along the attachment portion 258. As shown in FIGS. 9-11, each rib 278 is a flat, elongated ridge and is formed by displacing material in the blade body 260 from the first surface 248 toward the second surface 249. The ribs 278 may be pressed from either side, or may alternate such that one rib 278 is pressed from one side of the blade 226 and another rib 278 is pressed from the opposite side. In other embodiments, the rib 278 may be formed by adding material to one side of the blade body 260. In addition, each rib 278 includes a first portion 282 that is substantially parallel to the attachment portion 258 and a second portion 286 that is substantially parallel to the body 260. Stated another way, the first portion 282 is angled relative to the second portion 286 by the tang angle A.

Figure 13A:
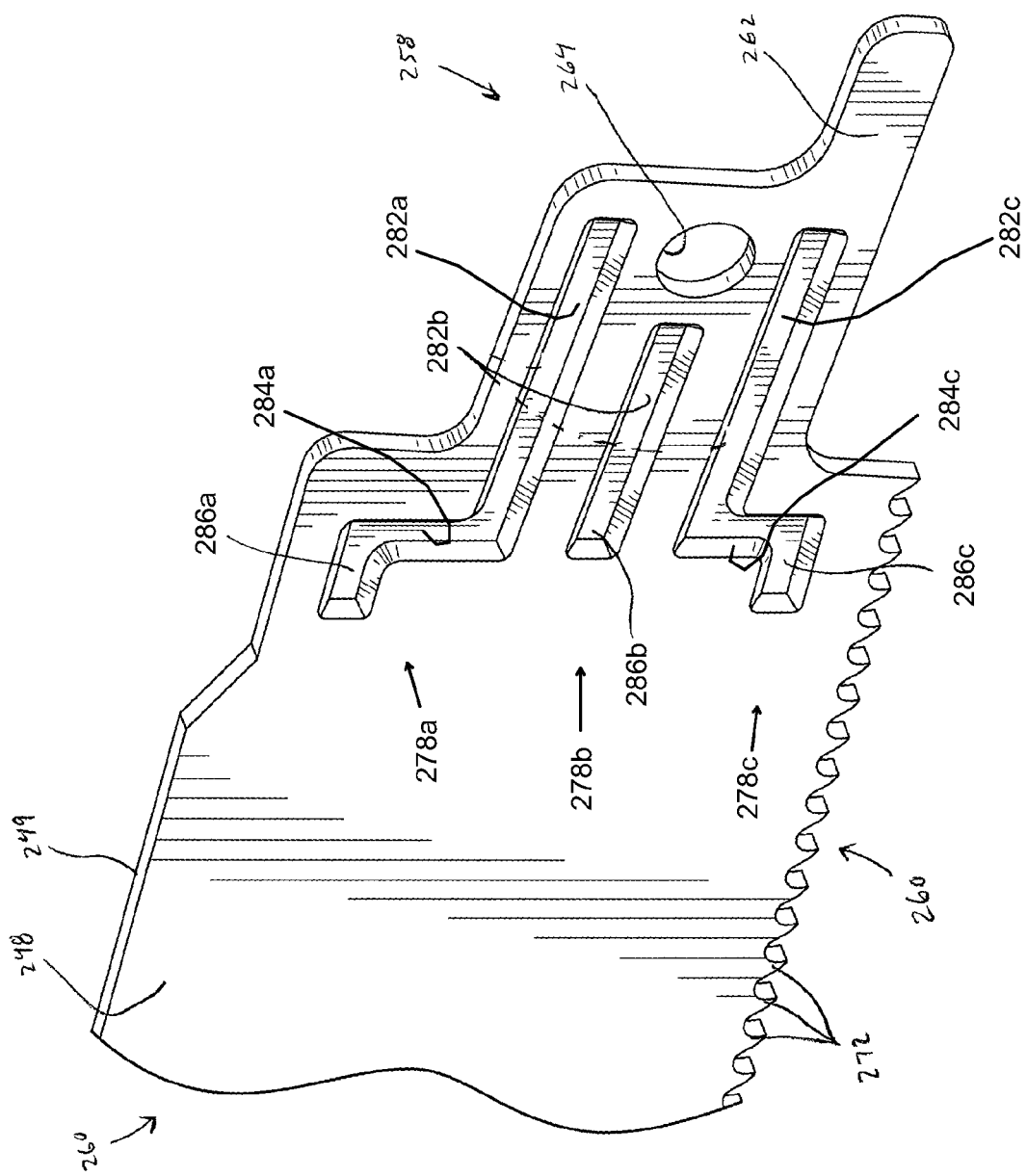
FIG. 13A is an enlarged perspective view of the saw blade of FIG. 12.
Figure 14:
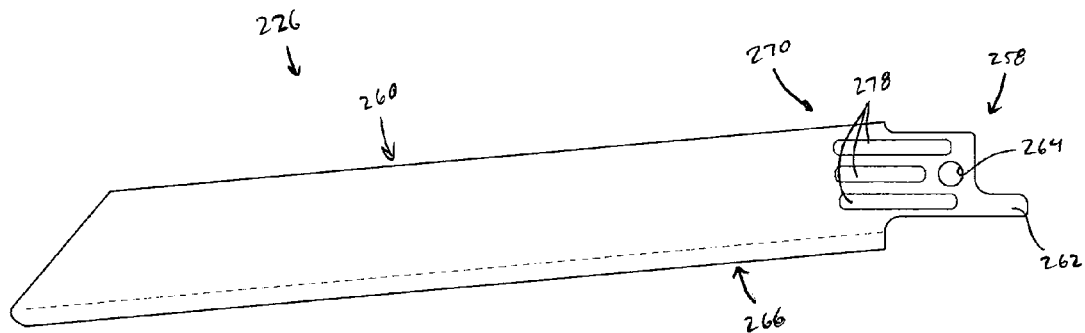
FIG. 14 is a side view of a saw blade according to another embodiment of the invention.
Figure 15:
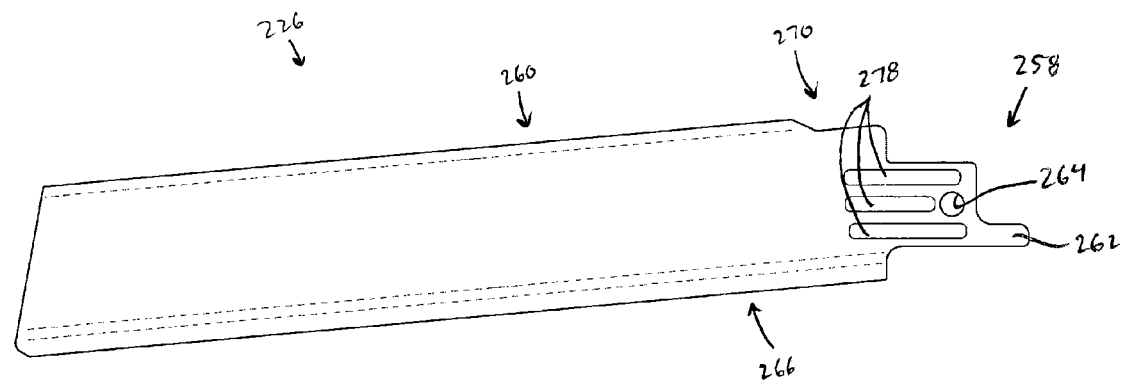
FIG. 15 is a side view of a saw blade according to another embodiment of the invention.
Figure 16:
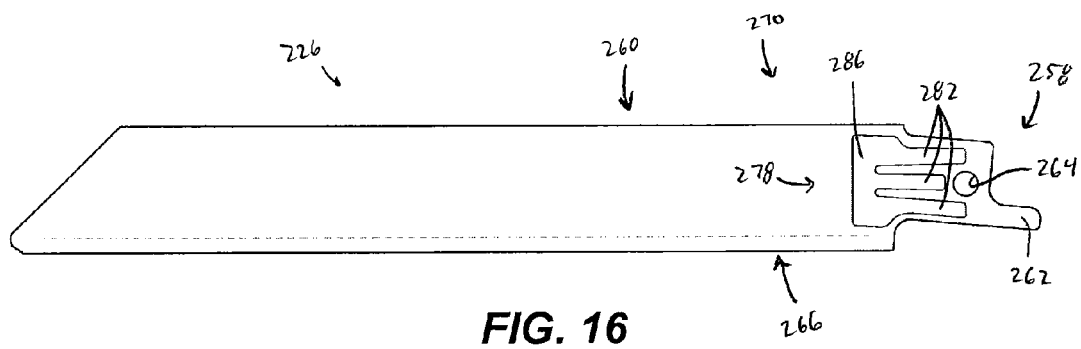
FIG. 16 is a side view of a saw blade according to another embodiment of the invention.
Figure 17:
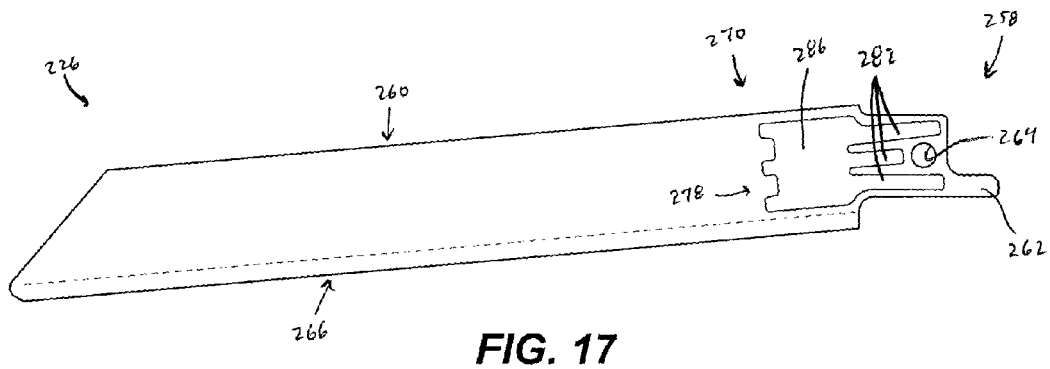
FIG. 17 is a side view of a saw blade according to another embodiment of the invention.
Figure 18:
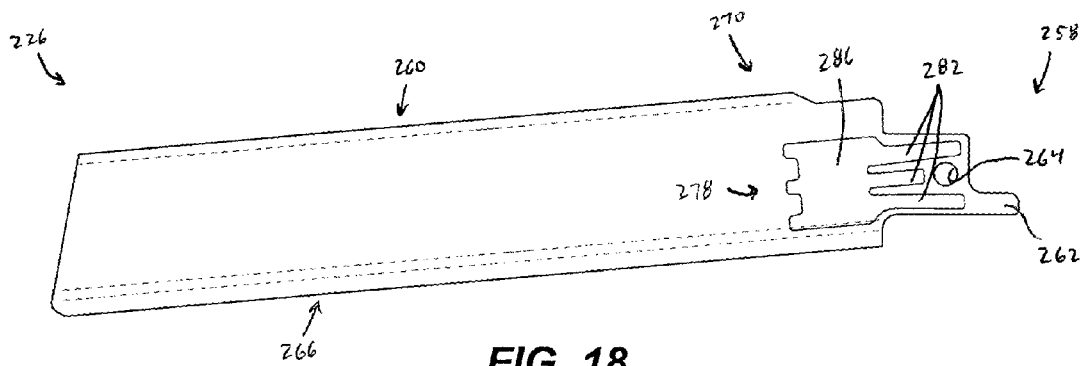
FIG. 18 is a side view of a saw blade according to another embodiment of the invention.
Figure 19:
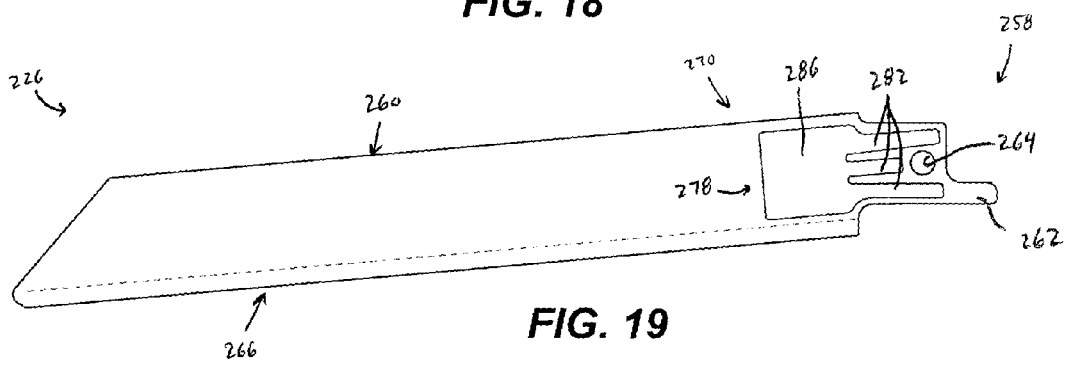
FIG. 19 is a side view of a saw blade according to another embodiment of the invention.
Figure 20:
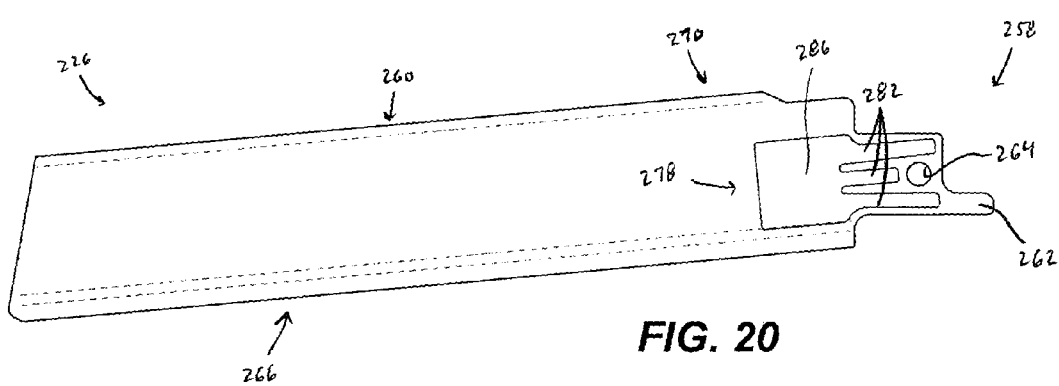
FIG. 20 is a side view of a saw blade according to another embodiment of the invention.

In a further embodiment illustrated in FIGS. 12 and 13, the first portions 282a, 282b, 282c of the ribs 278 are substantially parallel to one another. However, as shown in FIG. 13A, the outermost ribs 278a, 278c (i.e., the ribs 278 proximate the edges of the blade 226) include intermediate portions 284a, 284c extending away from one another. In the illustrated embodiment, the intermediate portions 284a, 284c extend in a direction that is substantially parallel to an edge of the blade body 260. The second portions 286a, 286c of the outermost ribs 278a, 278c extend in a direction that is substantially parallel to one another, while the second portion 286b of the interior rib 278b extends parallel to the first portion 282b. Stated another way, the ribs 278 that are proximate each edge of the blade 226 are shaped to follow the profile of the edge of the attachment portion 258 and at least a portion of the body 260. In the illustrated embodiment, the ribs 278 are spaced apart by about 0.07 inches, and the outermost ribs 278a, 278c are spaced about 0.045 inches from the edge of the blade 226. In other embodiments, the ribs 278 are spaced apart by about 0.06 inches, and the outermost ribs 278a, 278c are spaced about 0.04 inches from the edge of the blade 226.

In the embodiment illustrated in FIG. 13D, each rib 278 defines a ridge 280, perimeter 56a that is depressed with respect to the first surface 248 of the blade 226, and a perimeter 56b that is raised with respect to the second surface 249. Each ridge 280 is raised from the second surface 249 of the blade 226 by about 0.015 inches. In other embodiments, each ridge 280 may be raised from the second surface 249 of the blade 226 by between about 0.013 inches and about 0.017 inches. In still other embodiments, each ridge 280 may be raised from the second surface 249 by a distance that is approximately half the thickness of the blade 226.

As shown in FIG. 13D, the outer dimension of each perimeter 56a is about 0.09 inches, while the inner dimension of the perimeter 56a is about 0.05 inches. In other embodiments, the outer dimension is about 0.10 inches and the inner dimension is about 0.06 inches, such that the perimeter 56a has a width of about 0.02 inches. In addition, in the embodiment of FIG. 13D, the outer dimension of each perimeter 56b is about 0.07 inches and each ridge 280 has a width of about 0.03 inches. In other embodiments, the outer dimension of the perimeter 56b is about 0.08 inches and the width of the ridge 280 is about 0.04 inches. In still other embodiments, each perimeter 56a, 56b and each ridge 280 may be wider or narrower, and each rib 278 may be sized differently from the other ribs 278.

In still other embodiments, the ribs 278 may be straight (FIGS. 14 and 15) or have portions that are angled relative to one another by an angle that is larger or smaller than the tang angle A. Furthermore, it is evident from comparing FIGS. 14 and 15 that that the rib element 270 may be formed on many types of saw blades, including types other than the saw blade types shown in the drawings.

Referring now to the embodiments shown in FIGS. 16-20, the first portion 282 of each rib 278 may be angled relative to the first portions 282 of the other ribs 278, while the second portions 286 of the ribs 278 may be joined together.

In still other embodiments, the rib element 270 may be formed as a single rib 278 (FIGS. 21 and 22), or it may be formed as a series of aligned ribs 278 positioned end-to-end and extending along the length of the body 260 of the blade 226 (FIGS. 23 and 24). Alternatively, the rib element 270 may be formed as a single rib 278 extending between the attachment portion 258 and a point that is more than halfway along the length of the blade body 260 (FIGS. 25 and 26), or it may be formed as a single rib 278 extending only along a portion of the blade body 260 (FIG. 27). In a further alternative (FIGS. 28 and 29), the rib element 270 includes three ribs 278, wherein a first rib 278a extends along a length of the cutting edge 266, a second rib 278b extends from the attachment portion 258 and substantially along the length of the body 260, and a third rib 278c extends along an edge of the body 260 opposite the cutting edge 266. Finally, the rib element 270 may be formed as a single groove or rib 278 extending the full length of the blade 226, between an edge adjacent the attachment portion 258 and an edge proximate an opposite end of the body 260 (FIGS. 30-32), or a single groove 278 extending the length of the blade 226 proximate a back edge of the body 260 (FIGS. 33-34).

Similar to the honeycomb pattern 50 described above, the rib element 270 provides additional rigidity to the blade body 260 to resist unintentional bending of the saw blade 226, especially in the attachment portion 258. The added rigidity reduces deformation of the saw blade 226, improving the working life of the blade 226 and insuring that the cutting edge 266 remains straight to provide a cleaner cut.

Further, when the blade 226 is received within a blade clamp mechanism of a reciprocating saw, and in particular a slot in a saw spindle, the rib element 270 provides a tighter fit in the spindle. The rib element 270 takes up more room in the slot, preventing twisting of the blade 226 within the spindle. For example, the nominal portion of the saw blade 226, and more specifically, of the attachment portion 258, may have a nominal thickness between about 0.019 inches and about 0.062 inches, and the slot in the saw spindle may have a width of about 0.070 inches. As such, the rib element 270 has a thickness of between about 0.008 inches and about 0.051 inches, depending on the nominal thickness of the attachment portion 258. In other words, the thickness of rib element 270 is less than or equal to the difference between the width of the slot in the saw spindle and the nominal thickness of the attachment portion 258. Preferably, the rib element 270 has a thickness of up to about 0.043 inches.

Figure 35:
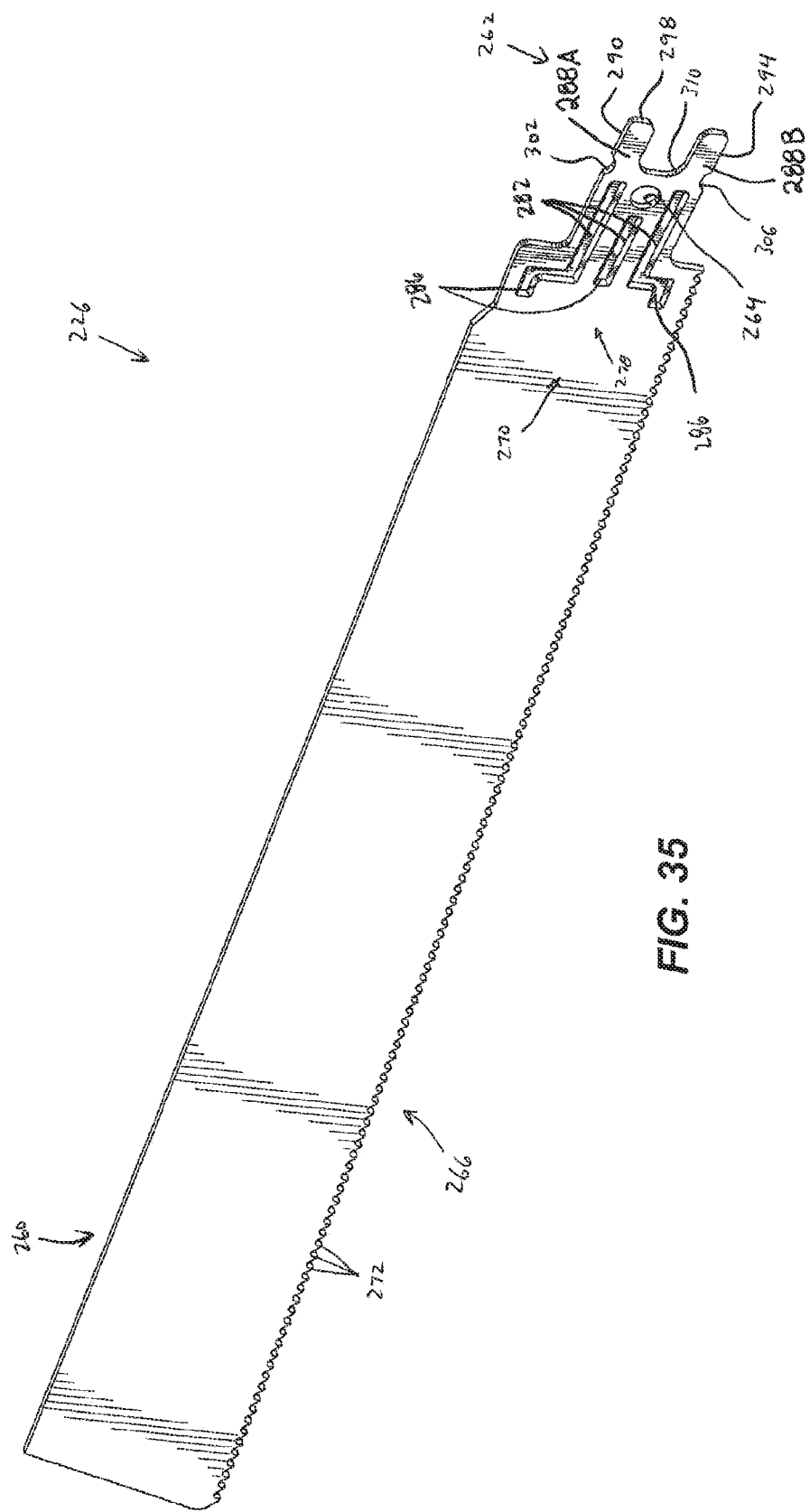
FIG. 35 is a perspective view of a saw blade according to another embodiment of the invention.
Figure 36:
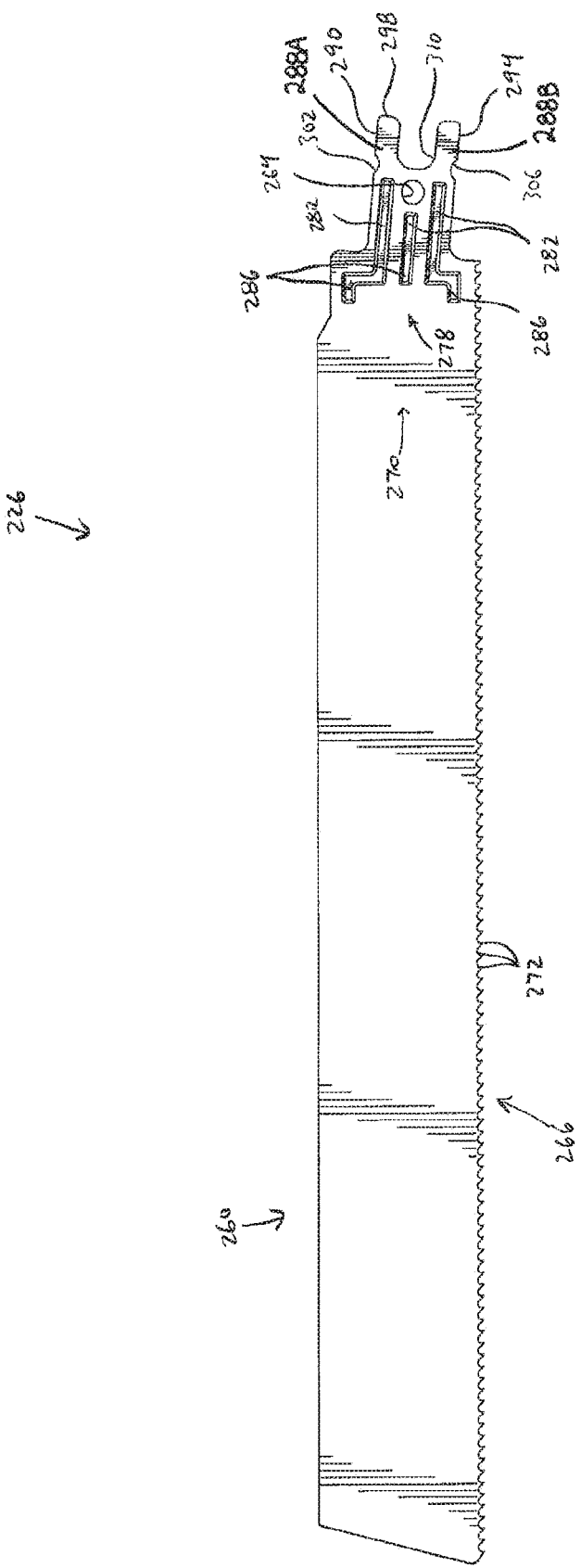
FIG. 36 is a side view of the saw blade of FIG. 35.

As described above, the rib element 270 can be incorporated into various types of saw blades. Referring to FIGS. 35 and 36, the blade 226 includes a cutting edge 266 and a tang 262 that is received by the clamp 20 to couple the blade 226 to the reciprocating saw. The cutting edge 266 includes cutting teeth 272 that extend along the length of the cutting edge 266. The tang 262 includes a first tang member 288A, a second tang member 288B, a top edge 290, a bottom edge 294, and a back edge 298. A semi-circular aperture 302 is located on the top edge 290 and a semi-circular aperture 306 is also located on the bottom edge 294. A generally U-shaped aperture 310 opens to the back edge 298. The locking aperture 264 extends through the blade 226 from side to side. Similar to the embodiment described with respect to FIGS. 12 and 13 above, the first portion of the ribs 278 are substantially parallel to one another, although the second portions 286 extend away from each other and extend parallel to an edge of the body 260 of the blade 226.

FIGS. 37-42 illustrate a reciprocating saw blade 426 according to another embodiment of the invention. The illustrated saw blade 426 is similar to the saw blade 26 described above with reference to FIGS. 1-8, and similar parts have been given the same reference numbers plus 400.

Figure 37:
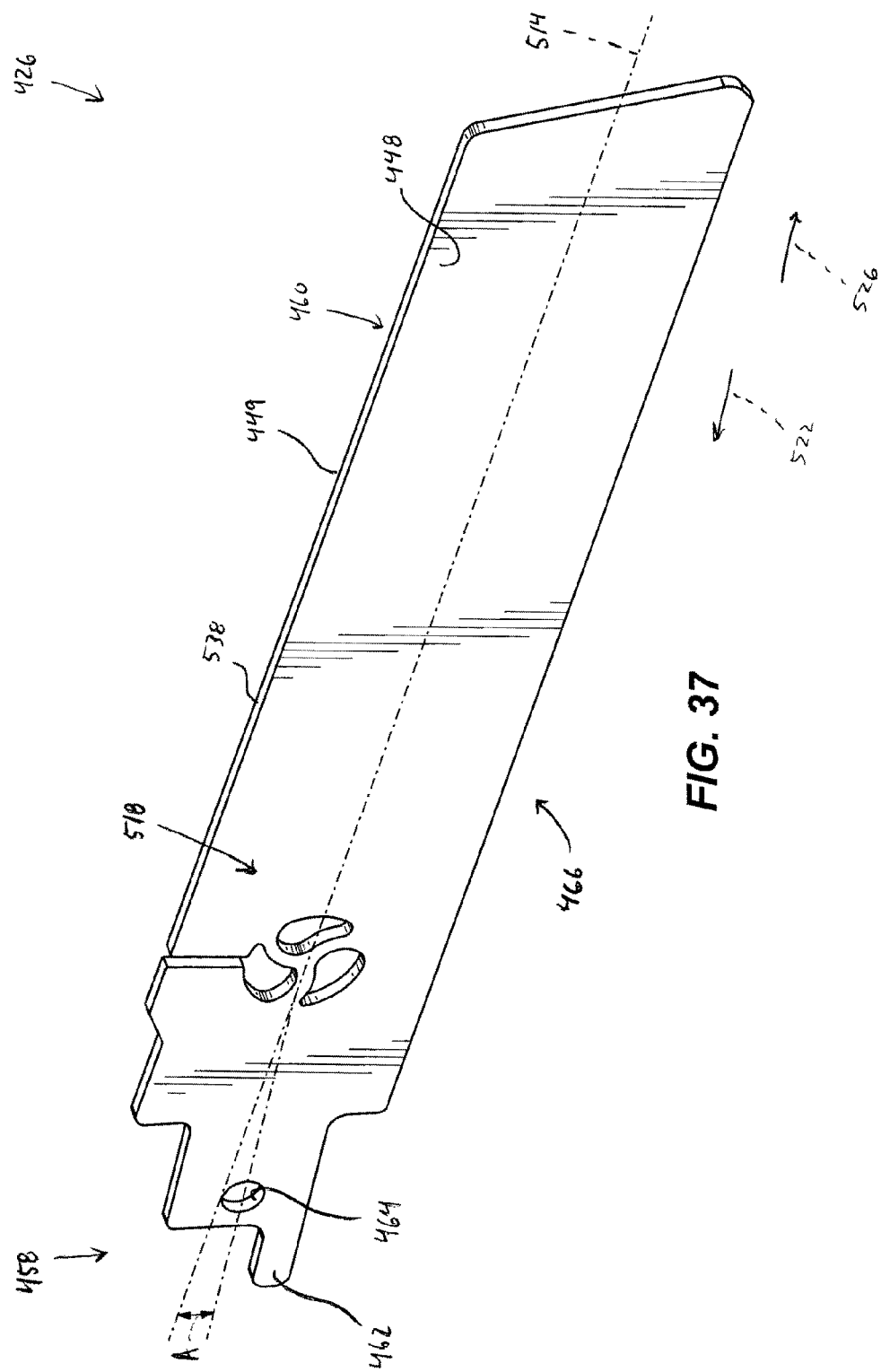
FIG. 37 is a perspective view of a saw blade according to another embodiment of the invention.

Referring to FIG. 37, the saw blade 426 includes a body 460 defining a longitudinal axis 514, an attachment portion 458 for coupling the blade 426 to a reciprocating saw, and a spring portion 518. The body 460 includes a first surface 448, a second surface 449 opposite the first surface 448, and a cutting edge 466. The attachment portion 458 includes a tang 462 and an aperture 464. In the illustrated embodiment, the attachment portion 458 is angled relative to the body 460 by a tang angle A. In other embodiments, the tang angle A may be larger or smaller.

Figure 38:
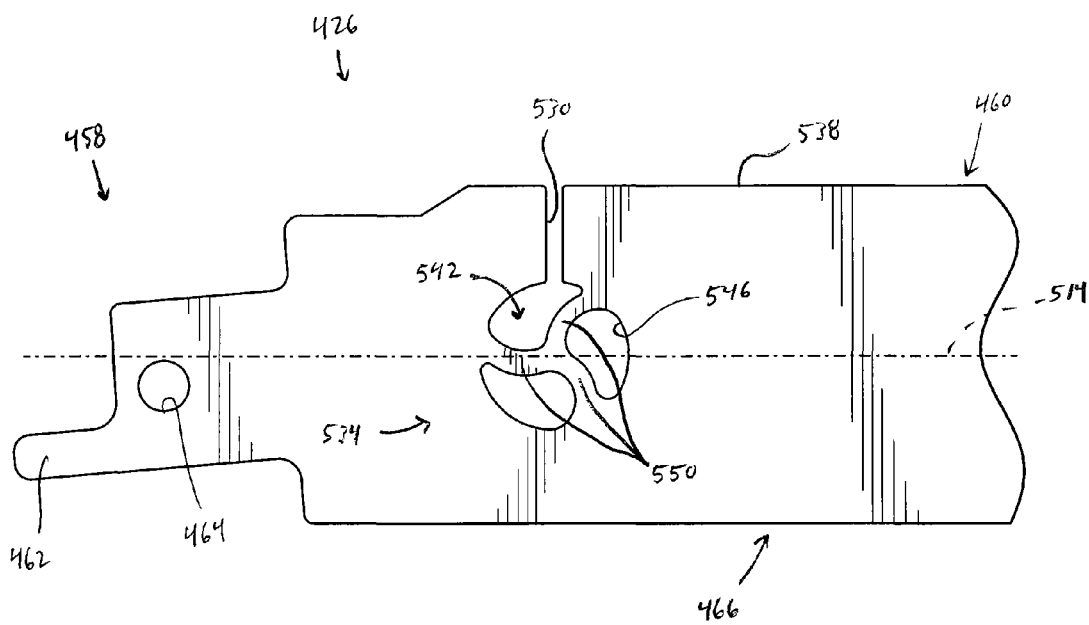
FIG. 38 is an enlarged side view of the saw blade of FIG. 37 in a relaxed state.
Figure 39:
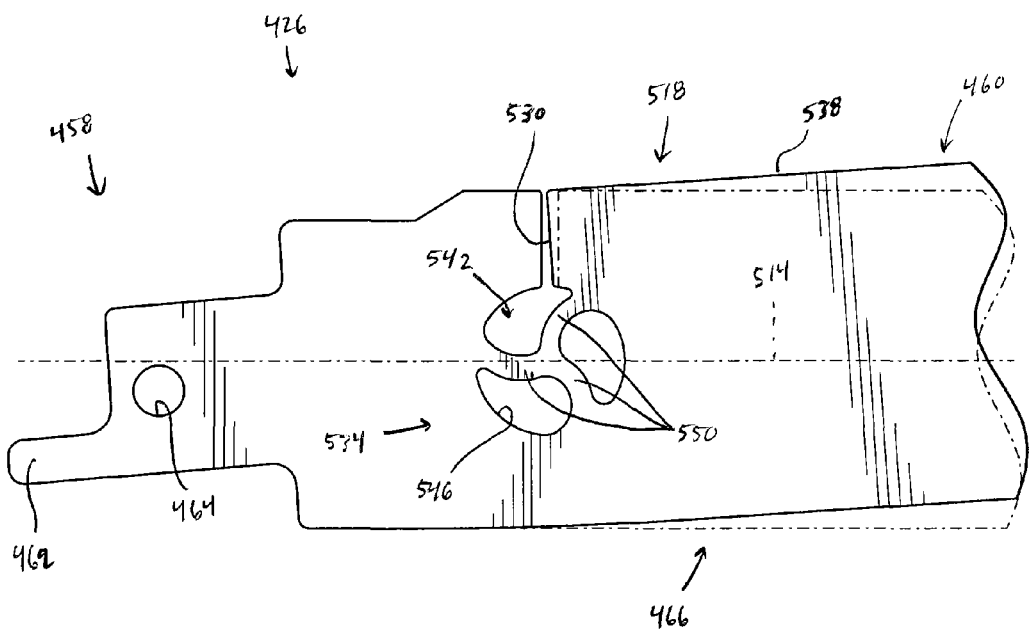
FIG. 39 is an enlarged side view of the saw blade of FIG. 37 in a compressed state.

As shown in FIGS. 38 and 39, the spring portion 518 is coupled to (e.g., formed at) a portion of the body 460 between the ends of the blade 426. The spring portion 518 includes a slot 530 and a spring element 534. The slot 530 extends between the spring element 534 and a back edge 538 of the blade 426, and the slot 530 is substantially perpendicular to the longitudinal axis 514. In other embodiments, the slot 530 may be oriented at an angle other than 90° with respect to the longitudinal axis 514. The spring element 534 is positioned between the back edge 538 and the cutting edge 466. In the illustrated embodiment, the spring element 518 is approximately halfway between the back edge 538 and the cutting edge 466.

In the embodiment illustrated in FIG. 38, the spring element 534 includes an opening 542 defining an inner perimeter 546 and three arms 550. Each arm 550 extends from a point on the inner perimeter 546 to a center of the opening 542, where the arms 550 join together. In the illustrated embodiment, the arms 550 have an arcuate shape and are angularly spaced apart by about approximately 120°. In other embodiments, the spring element 534 may include fewer or more than three arms 550. Also, the arms 550 and the slot 530 may have other shapes or may be arranged in other positions.

Generally, the slot 530 and the opening 542 are formed by removing material from the blade 426, creating a stress concentration in the areas near the slot 430 and spring element 534 and thereby reducing the stress on the cutting teeth. The removed material (i.e., the slot 530 and the opening 542) causes the body 460 to yield more easily, making the body 460 more flexible. The arms 550 strengthen the spring portion 518 of the blade 426 by distributing stresses throughout the body 460, increasing the nominal stiffness of the blade 426. This stiffness creates a spring effect.

During operation, the saw blade 426 is reciprocated in a cutting direction 522 (FIG. 37) and a return direction 526 (FIG. 37) to cut through a work piece. In some embodiments, the blade 426 is used to cut through work pieces composed of wood having nails extending through or embedded therein. Referring to FIG. 39, when the blade 426 encounters a nail or other obstruction during a cutting operation, the reaction force on the end of the blade 426 opposite the attachment portion 458 overcomes the nominal stiffness of the spring element 534. The blade 426 flexes such that the end of the blade 426 opposite the attachment portion 458 pivots about the opening 542 and moves toward the attachment portion 458. The arms 550 absorb the reaction force and distribute the stress through the body 460, causing the end of the body 460 to rebound and move away from the slot 530. This brings the cutting edge 466 back into engagement with the work material.

The flexing movement of the body 460 about the opening 542 relieves dynamic loading on the cutting teeth by distributing the stress throughout the blade body 460. The movement also creates various cutting angles and provides different contact surfaces between each tooth and the work surface. This distributes the amount of wear more evenly throughout the cutting edge 466, extending the useful life of the blade 426 and improving cutting time.

Figure 40:
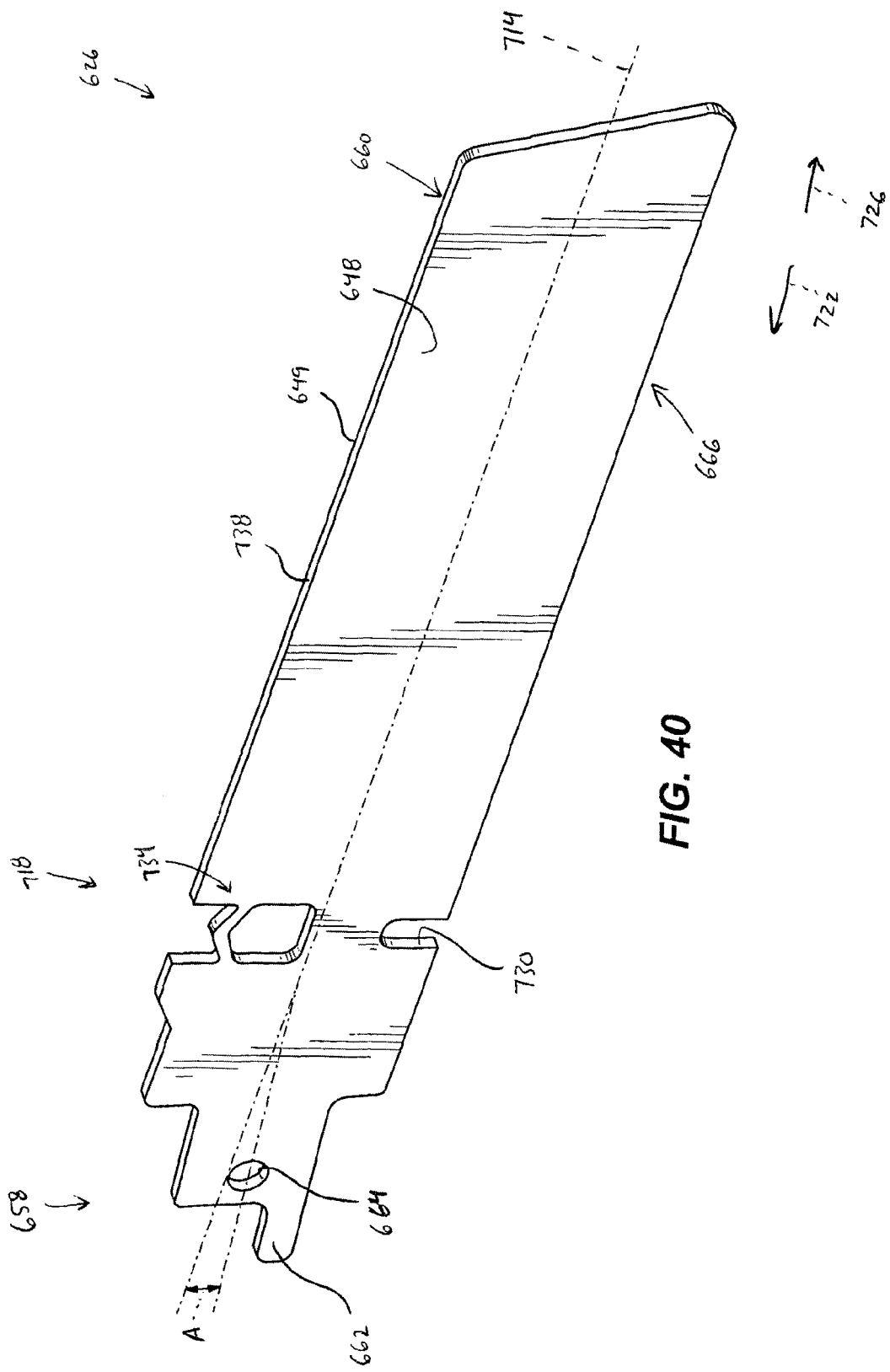
FIG. 40 is a perspective view of a saw blade according to another embodiment of the invention.
Figure 41:
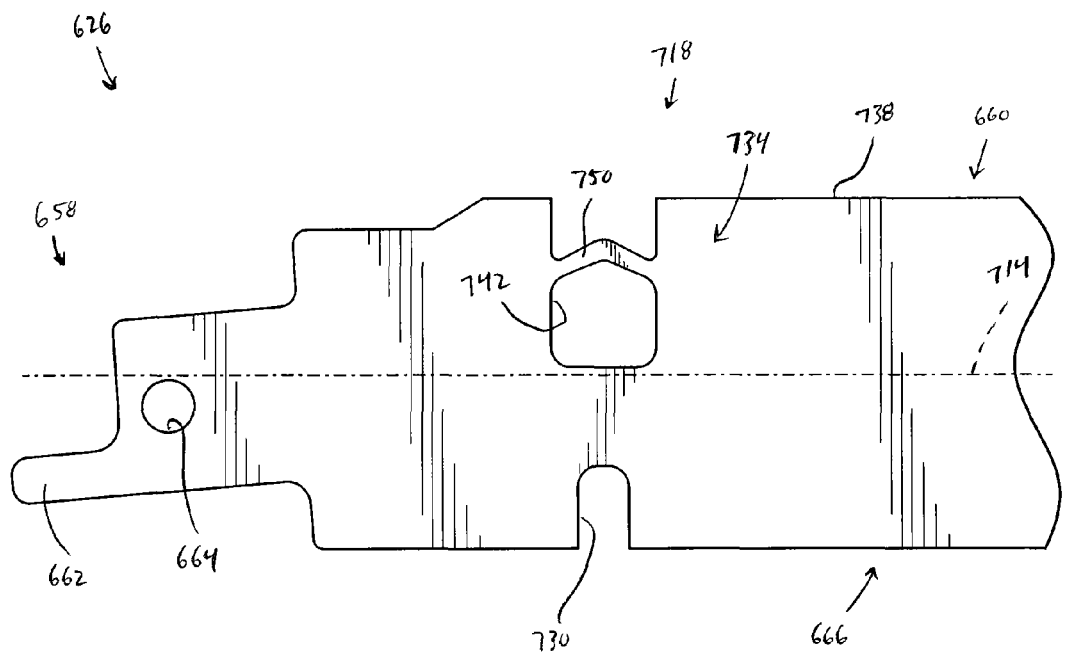
FIG. 41 is an enlarged side view of the saw blade of FIG. 40 in a relaxed state.
Figure 42:
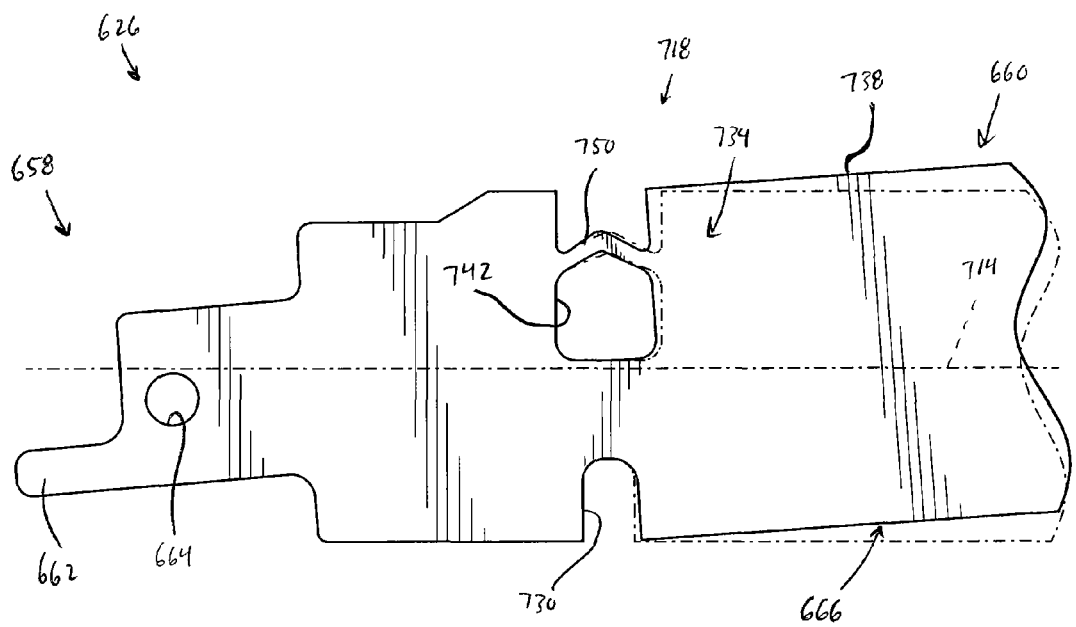
FIG. 42 is an enlarged side view of the saw blade of FIG. 40 in a compressed state.

FIGS. 40-42 illustrate a reciprocating saw blade 626 according to another embodiment of the invention. The illustrated saw blade 626 is similar to the saw blade 426 described above with reference to FIGS. 37-39, and similar parts have been given the same reference numbers, plus 200. The saw blade 626 includes a body 660 defining a longitudinal axis 714, an attachment portion 658 for coupling the blade 626 to a reciprocating saw, and a spring portion 718. The body 660 includes a first surface 648, a second surface 649 opposite the first surface 648, and a cutting edge 666.

Referring to FIG. 41, the spring portion 718 is positioned proximate (i.e., formed at) a back edge 738 of the blade 626, and the slot 730 is positioned proximate (i.e., formed at) the cutting edge 666 of the blade 626. In addition, the opening 742 of the spring element 734 is elongated and extends substantially perpendicular to the longitudinal axis 714. The spring element 734 includes one arm 750 having an arched shape and extending across the opening 742. In other embodiments, the arm 750 may have other shapes, and may be asymmetrical with respect to a line extending longitudinally through the center of the opening 742.

As in the embodiment shown in FIGS. 37-39, the slot 730 and the opening 742 are formed by removing material in the body 660, creating a stress concentration in the area of the spring element 734. The stress is absorbed by the arm 750 and distributed through the body 660, relieving stress on the cutting teeth. In further embodiments, the spring element 734 may include multiple arms 750 extending entirely or partially across the opening 742. The arm 750 and the slot 730 may have other shapes or may be arranged in other positions.

Figure 43:
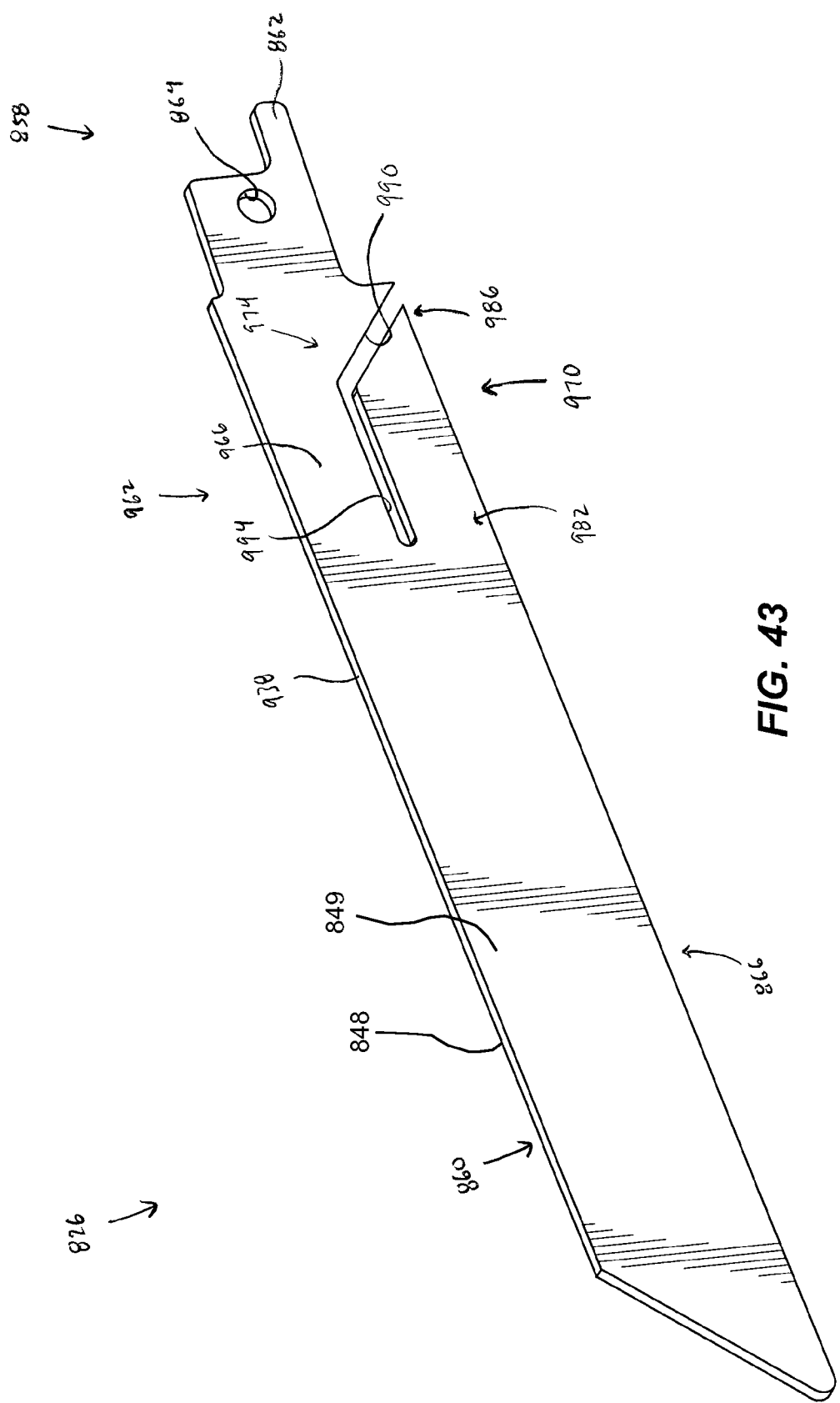
FIG. 43 is a perspective view of a saw blade according to another embodiment of the invention.
Figure 44:
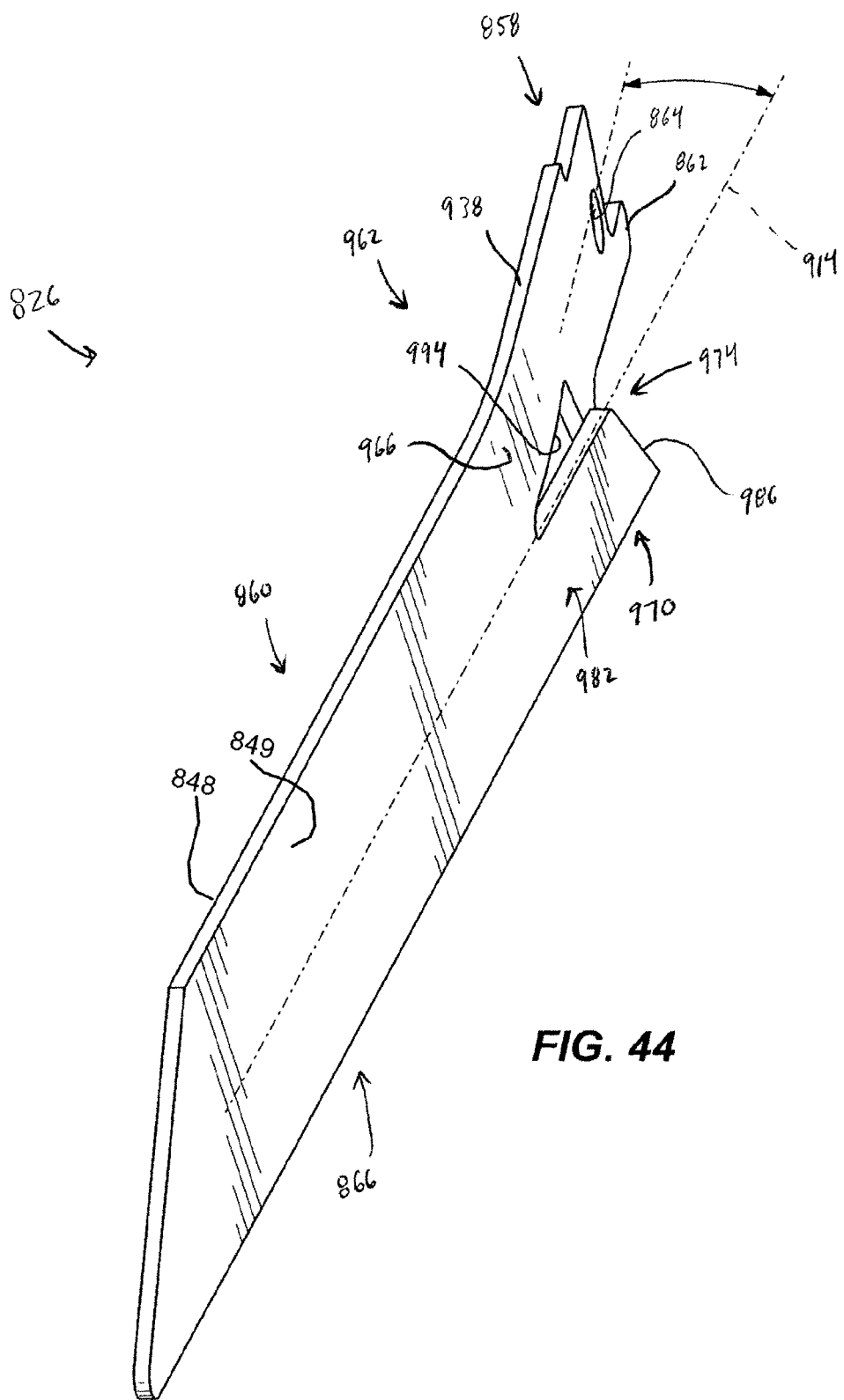
FIG. 44 is a perspective view of the saw blade of FIG. 43 in a flexed state.
Figure 45:
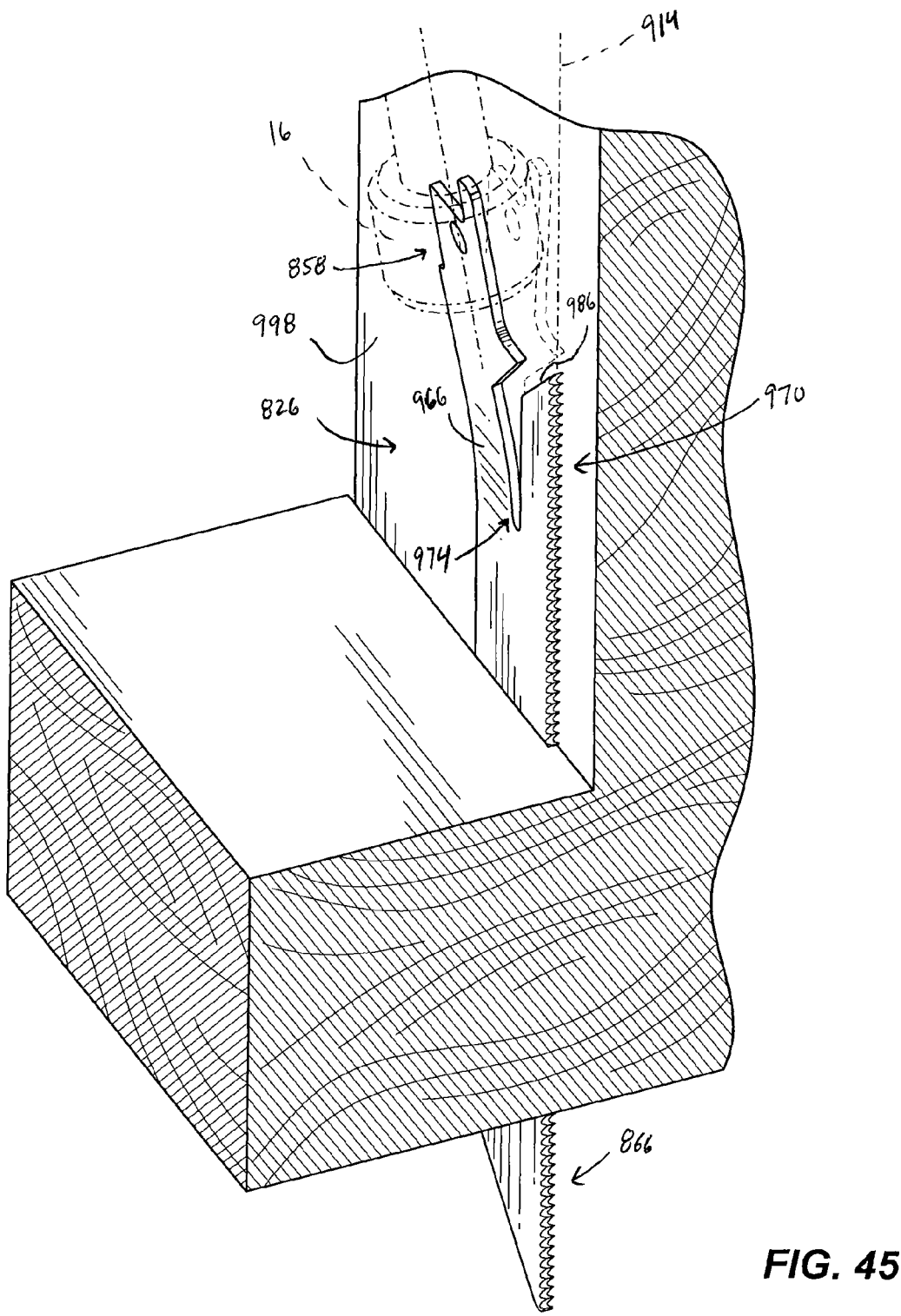
FIG. 45 is a perspective view of the saw blade of FIG. 44 in operation to cut a workpiece.

FIGS. 43-45 illustrate a reciprocating saw blade 826 according to another embodiment of the invention. The illustrated saw blade 826 is similar to the saw blade 426 described above with reference to FIGS. 37-39, and similar parts have been given the same reference numbers plus 400.

Referring to FIGS. 43 and 44, the saw blade 826 includes a body 860 defining a longitudinal axis 914 (FIG. 44), an attachment portion 858 for coupling the blade 826 to a reciprocating saw, and a flexible portion 962. The body 860 includes a first surface 848, a second surface 849 opposite the first surface 848, and a cutting edge 866. The attachment portion 858 includes a tang 862 and an aperture 864.

The flexible portion 962 is positioned proximate (i.e., formed at) a portion of the body 860 between the attachment portion 858 and an end opposite the attachment portion 858. The flexible portion 962 includes a flexible member or bridge member 966, a follower member 970, and a slot 974 defined between the bridge member 966 and the follower member 970. The bridge member 966 defines a portion of a back edge 938 of the blade 826. The follower member 970 includes a first end 982, which is coupled to the body 860, and a second end 986 that is free, or not coupled to the body 860. The follower member 970 defines a portion of the cutting edge 866.

The slot 974 includes a first leg 990 and a second leg 994. The first leg 990 extends from a position near the juncture of the cutting edge 866 and the body 860. The first leg 990 extends toward the back edge 938 at an angle relative to the longitudinal axis 914, and extends toward the end of the body 860 opposite the attachment portion 858. In the illustrated embodiment, the angle is approximately 45°. The first leg 990 ends at a position between the back edge 938 and the cutting edge 866. In the illustrated embodiment, the first leg 990 extends about halfway through the body 860. The second leg 994 extends from the end of the first leg 990 away from the attachment portion 858 in a direction that is substantially parallel to the longitudinal axis 914. In other embodiments, the second leg 994 may be oriented at an angle with respect to the longitudinal axis 914. In the illustrated embodiment, the ratio of the length of the saw blade 826 to the length of the second leg 994 is approximately 8.6:1. In other embodiments, the ratio may be lower, such as approximately 4:1. The slot 974 may be formed in the blade body 860 as part of an operation for stamping the blade body 860, or may be cut using a laser-cutting process after the blade body 860 is formed.

FIGS. 44 and 45 illustrate how the bridge member 966 and the follower member 970 bend independently of one another. When the saw blade 826 is positioned near an inside corner (FIG. 45), for example, the inside wall 998 contacts the forward portion 16 of the reciprocating saw 10, causing the saw blade 826 to bend along the wall 998. Because the bridge member 966 is coupled to the body 860, the bridge member 966 bends with the saw blade 826 against the wall 998. The follower member 970, however, is not coupled to the body 860 at the second end 986, and therefore the follower member 970 remains aligned with the first end of the body 860 opposite the attachment portion 858. Since the first end of the body 860 is bent in a manner that is substantially parallel to the wall 998, the follower member 970 is flush with the inside wall 998. The attachment portion 858, the bridge member 966, and the back edge 938 bend away from the longitudinal axis 914 and out of a plane defined by the second surface 849 of the body 860. This permits the cutting edge 866 to remain flush against the inside wall 998, even though the bridge member 966 is bent. As the saw blade 826 reciprocates, the cutting edge 866 cuts the work piece along a line that is flush with the inside wall 998.

In another embodiment, the saw blade 826 may incorporate a flexible portion as described above with respect to FIGS. 43-45 as well as a honeycomb pattern or a rib element 270 as described above with respect to any of FIGS. 1-34.

Thus, the invention provides, among other things, an accessory for a power tool. Although the invention has been described in detail with reference to certain preferred embodiments, variations and modifications exist within the scope and spirit of one or more independent aspects of the invention as described. Various features of the invention are set forth in the following claims.

The invention claimed is:

1. A reciprocating saw blade for use with a reciprocating saw, the saw blade comprising:
    a body including a first substantially planar surface and a second substantially planar surface opposite the first surface;
    an attachment portion including a tang and an aperture for coupling the saw blade to the reciprocating saw;
    a cutting edge including a plurality of cutting teeth; and
    a rib arrangement including a pair of rib members, each rib member being raised relative to the first substantially planar surface, one of the rib members being proximate the cutting edge and the other of the rib members being proximate a back edge of the blade opposite the cutting edge, each rib member including a first portion and a second portion, the first portion of each of the rib members extending along the attachment portion proximate the aperture, the first portions being substantially parallel to one another and located on opposing sides of the aperture so that the aperture is disposed between the first portions, the second portion of each of the rib members extending along at least a portion of the body, the second portion of each rib member being angled relative to the first portion of the rib member, and the second portion of each rib member extending parallel to an edge of the body;
    wherein the rib arrangement further includes an interior rib member positioned between the rib members, the interior rib including a first portion that is parallel to the first portion of the rib members.

2. The reciprocating saw blade of claim 1, each of the rib members including an intermediate portion extending between the first portion and the second portion, the intermediate portion of one of the rib members extending away from the intermediate portion of the other rib member.

3. The reciprocating saw blade of claim 1, wherein each rib member is raised relative to the first substantially planar surface by a distance that is approximately 0.015 inches.

4. The reciprocating saw blade of claim 1, wherein the aperture is substantially circular.

5. The reciprocating saw blade of claim 1, wherein the rib members form protrusions on the first substantially planar surface, and form cavities on the second substantially planar surface.

6. The reciprocating saw blade of claim 1, wherein the attachment portion is angled relative to the saw blade body.

7. The reciprocating saw blade of claim 1, wherein the attachment portion has a first length measured from a top edge to a bottom edge, and the saw body has a second length measured from the cutting edge to the back edge, and wherein the first length is less than the second length.

8. The reciprocating saw blade of claim 1, wherein the tang includes a first tang member and a second tang member, and wherein the first portion of one of the rib members is proximate the first tang member.

* * * * *